(12) United States Patent
Hussain et al.

(10) Patent No.: US 11,215,994 B1
(45) Date of Patent: Jan. 4, 2022

(54) ROBOTIC SUBSURFACE IMPACT PROTECTION SYSTEM

(71) Applicant: Saudi Arabian Oil Company, Dhahran (SA)

(72) Inventors: Iqbal Hussain, Khobar (SA); Abdullah Zubail, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/904,393

(22) Filed: Jun. 17, 2020

(51) Int. Cl.
| F16L 1/11 | (2006.01) |
| G05D 1/00 | (2006.01) |
| G01V 3/12 | (2006.01) |
| F16L 57/00 | (2006.01) |

(52) U.S. Cl.
CPC ............. *G05D 1/0094* (2013.01); *F16L 1/11* (2013.01); *G01V 3/12* (2013.01); *F16L 57/00* (2013.01)

(58) Field of Classification Search
CPC .... A01G 2025/003; E02F 5/102; E02F 9/245; F16L 1/11; F16L 57/00; A01B 13/08; A01B 79/005; A01B 63/008; E02D 19/18; E02D 19/16; E02D 2250/003; H02G 1/06;
(Continued)

(56) References Cited

U.S. PATENT DOCUMENTS

| 3,276,208 A | * | 10/1966 | Bolt | ........................ E02D 19/16 |
| | | | | 405/38 |
| 3,339,369 A | * | 9/1967 | Ryan | ........................ H02G 1/06 |
| | | | | 405/157 |
| 3,618,329 A | | 11/1971 | Hanson | |

(Continued)

FOREIGN PATENT DOCUMENTS

| CA | 1305795 C | 7/1992 |
| CN | 105803891 A | 7/2016 |

(Continued)

OTHER PUBLICATIONS

Da Silva, Agnelo Rocha, Mahta Moghaddam, and Mingyan Liu. "The future of wireless underground sensing networks considering physical layer aspects." The Art of Wireless Sensor Networks. Springer, Berlin, Heidelberg, 2014. 451-484.

(Continued)

*Primary Examiner* — Carib A Oquendo
(74) *Attorney, Agent, or Firm* — Leason Ellis LLP

(57) ABSTRACT

A robotic vehicle for moving above ground while fabricating a subsurface polymer layer to protect an underground structure is provided. The robotic vehicle includes: a body; a rotational member that contacts the ground and moves the body over the ground; a ripper assembly having a proximal end that moves with the body, and a distal end that moves underground at a fabrication depth in response to the movement of the proximal end while fabricating the polymer layer; a ground penetrating radar (GPR) that locates and (Continued)

measures a depth of the underground structure below the ground; and a computerized control system that controls the rotational member, the distal end of the ripper assembly, and the GPR to move the body over the located underground structure while tracking the location of the underground structure and fabricating the polymer layer at the fabrication depth and above the measured depth of the underground structure.

20 Claims, 9 Drawing Sheets

(58) Field of Classification Search
CPC . H02G 9/025; G01V 3/15; G01V 3/12; G05D 1/0088; G05D 1/0094
USPC ....... 405/155, 156, 157, 174, 175, 176, 180, 405/181
See application file for complete search history.

(56) References Cited

U.S. PATENT DOCUMENTS

| | | | | |
|---|---|---|---|---|
| 4,047,387 | A * | 9/1977 | Tamura | E02B 13/00 405/38 |
| 5,303,663 | A | 4/1994 | Salestrom | |
| 5,607,205 | A * | 3/1997 | Burdick | E01C 19/00 299/1.5 |
| 5,957,624 | A * | 9/1999 | Carter, Jr. | E02F 3/8825 405/129.6 |
| 6,070,673 | A * | 6/2000 | Wendte | A01B 79/005 172/2 |
| 6,999,021 | B2 | 2/2006 | Taylor, Jr. et al. | |
| 8,849,523 | B1 * | 9/2014 | Chan | B64D 1/18 701/50 |
| 9,213,934 | B1 | 12/2015 | Versteeg et al. | |
| 9,615,518 | B2 * | 4/2017 | Smucker | A01G 29/00 |
| 9,777,881 | B2 | 10/2017 | Wang et al. | |
| 10,344,435 | B2 * | 7/2019 | Berning | E01C 23/127 |
| 2003/0189428 | A1 * | 10/2003 | Hansen | G01V 3/15 324/329 |
| 2015/0035693 | A1 * | 2/2015 | Hall | G01S 13/103 342/22 |

FOREIGN PATENT DOCUMENTS

| | | |
|---|---|---|
| IN | 307274 A | 4/2013 |
| KR | 20180033724 A | 4/2018 |

OTHER PUBLICATIONS

Toma, Daniel Mihai, Joaquin del Rio, and Antoni Mànuel-Làzaro. "Self-powered high-rate wireless sensor network for underground high voltage power lines." 2012 IEEE International Instrumentation and Measurement Technology Conference Proceedings. IEEE, 2012. 5 pages.

International Search Report and Written Opinion of corresponding PCT Application No. PCT/US2021/037832, dated Oct. 18, 2021; 8 pages.

* cited by examiner

ROBOTIC SUBSURFACE IMPACT PROTECTION SYSTEM

FIELD OF THE DISCLOSURE

The present disclosure relates generally to protecting underground assets, such as pipelines, from impact damage, and specifically to a robotic subsurface impact protection system for injecting molten polymer at a desired depth below ground to protect an underground asset.

BACKGROUND OF THE DISCLOSURE

Protecting buried/subsurface infrastructure (e.g., pipelines) from above-ground impact damage without the need for trenching and back-filling can be a challenging task. The encroachment of existing buried high pressure pipeline corridors due to above-ground building and construction activities presents a high risk to the integrity of pipelines and vessels. This encroachment can also result in a loss of product from leaks caused from external damage, which can lead to health, safety, and environmental issues. The protection of buried pipeline networks from impact damage is important to operators of the pipelines and other third parties that have an interest in where the encroachment is taking place.

It is in regard to these and other problems in the art that the present disclosure is directed to provide a technical solution for an effective robotic subsurface impact protection system to protect buried and subsurface structures from above-ground impact damage and without the need for trenching and back-filling.

SUMMARY OF THE DISCLOSURE

According to an embodiment, a robotic vehicle for moving above ground while fabricating a subsurface polymer layer to protect an underground structure is provided. The robotic vehicle comprises: a body for moving over the ground; a rotational member coupled to the body and configured to contact the ground and move the body over the ground during the fabricating of the subsurface polymer layer; a ripper assembly having a proximal end coupled to and configured to move with the body, and a distal end coupled to the proximal end and configured to move underground at a fabrication depth in response to the movement of the proximal end while fabricating the polymer layer; a ground penetrating radar (GPR) configured to locate and measure a depth of the underground structure below the ground during the fabricating of the polymer layer; and a computerized control system (CCS) configured to protect the underground structure by controlling the rotational member, the distal end of the ripper assembly, and the GPR to move the body over the located underground structure while tracking the location of the underground structure and fabricating the polymer layer at the fabrication depth and above the measured depth of the underground structure.

In an embodiment, the ripper assembly comprises: a ripper blade at the distal end and configured to fabricate the polymer layer by injecting compressed air and molten polymer into the subsurface at the fabrication depth; and a ripper arm coupled to the body at the proximal end and to the ripper blade at the distal end, and configured to supply the compressed air and the molten polymer to the ripper blade during the fabricating of the polymer layer.

In an embodiment: the ripper blade is adjustable in longitudinal tilt angle while moving underground to vary the fabrication depth during the fabricating of the polymer layer; and the CCS is configured to control the fabricating of the polymer layer at a desired height above the measured depth of the underground structure by controlling the longitudinal tilt angle of the ripper blade during the fabricating of the polymer layer.

In an embodiment: the ripper blade is adjustable in lateral tilt angle while moving underground to vary an orientation of the polymer layer during the fabricating of the polymer layer; the distal end of the ripper assembly comprises an infrared camera configured to image the orientation of the polymer layer during the fabricating of the polymer layer; and the CCS is configured to control the fabricating of the polymer layer to have a desired orientation by controlling the lateral tilt angle of the ripper blade while using the infrared imaging of the orientation during the fabricating of the polymer layer.

In an embodiment, the robotic vehicle further comprises: a polymer storage container coupled to the body and configured to store thermoplastic polymer; a polymer melting unit coupled to the body and configured to melt the stored thermoplastic polymer into the molten polymer and supply the molten polymer to the ripper arm; a compressed air storage container coupled to the body and configured to store the compressed air and supply the stored compressed air to the ripper arm; and a battery coupled to the body and configured to supply electric power to the robotic vehicle, wherein the robotic vehicle is self-contained and configured to fabricate the polymer layer using the battery as its principal source of power.

In an embodiment: the distal end of the ripper assembly is adjustable in depth below the ground while moving underground to vary the fabrication depth during the fabricating of the polymer layer; and the CCS is configured to control the fabricating of the polymer layer at a desired height above the underground structure by adjusting the depth of the distal end of the ripper assembly during the fabricating of the polymer layer.

In an embodiment: the distal end of the ripper assembly comprises an ultrasonic sensor configured to measure a height of the fabrication depth above the underground structure during the fabricating of the polymer layer; and the CCS controls the fabricating of the polymer layer at the desired height above the underground structure by using the measured height during the fabricating of the polymer layer.

In an embodiment, the robotic vehicle further comprises a depth gauge configured to measure the fabrication depth during the fabrication of the polymer layer, wherein: the distal end of the ripper assembly comprises an infrared camera configured to measure a thickness of the polymer layer during the fabricating of the polymer layer; the CCS is configured to control the fabricating of the polymer layer to have a desired thickness by using the measured thickness of the polymer layer during the fabricating of the polymer layer; and the CCS is configured to generate a thickness variation profile of the polymer layer by tracking the measured fabrication depth and the measured thickness of the polymer layer over time during the fabricating of the polymer layer.

In an embodiment: the GPR is configured to generate an elevation profile of distinct layers below the ground during the fabricating of the polymer layer, the elevation profile including respective depth, thickness, and density measurements of the distinct layers, the distinct layers including the underground structure, the polymer layer, and a subsurface layer above the polymer layer; the CCS is configured to estimate a subsurface load on the polymer layer during the fabricating of the polymer layer by using the measured thickness and the measured density of the subsurface layer above the polymer layer; and the CCS is configured to set the desired thickness of the polymer layer during the fabricating of the polymer layer based on the estimated subsurface load on the polymer layer.

In an embodiment, the robotic vehicle further comprises an infrared camera configured to image a thermal distribution of a top surface of the polymer layer during the fabricating of the polymer layer, wherein the CCS is configured to use the imaged thermal distribution of the top surface of the polymer layer to verify thermal integrity of the polymer layer or to adjust the fabricating of the polymer layer to improve the thermal integrity of the polymer layer.

According to another embodiment, an automated method of protecting an underground structure by fabricating a subsurface polymer layer using a moving robotic vehicle under control of a computerized control system (CCS) of the robotic vehicle is provided. The method comprises: moving a body of the robotic vehicle over the ground by controlling, using the CCS, a rotational member of the robotic vehicle that is coupled to the body and contacts the ground; moving a proximal end of a ripper assembly of the robotic vehicle with the body, the proximal end being coupled to the body; moving a distal end of the ripper assembly underground at a fabrication depth in response to the moving of the proximal end, the distal end being coupled to the proximal end; locating and measuring a depth of the underground structure using a ground penetrating radar (GPR) of the robotic vehicle; moving the body over the located underground structure by controlling, using the CCS, the rotational member while tracking, using the CCS, the location of the underground structure and fabricating, using the distal end of the ripper assembly under the control of the CCS, the polymer layer at the fabrication depth and above the measured depth of the underground structure.

In an embodiment, fabricating the polymer layer comprises: injecting, by a ripper blade of the ripper assembly at the distal end, compressed air and molten polymer into the subsurface at the fabrication depth; and supplying, by a ripper arm of the ripper assembly coupled to the body at the proximal end and to the ripper blade at the distal end, the compressed air and the molten polymer to the ripper blade.

In an embodiment, fabricating the polymer layer comprises: varying the fabrication depth of the polymer layer by adjusting a longitudinal tilt angle of the ripper blade while moving underground; and fabricating the polymer layer at a desired height above the measured depth of the underground structure by controlling, using the CCS, the longitudinal tilt angle of the ripper blade.

In an embodiment, fabricating the polymer layer comprises: varying an orientation of the polymer layer by adjusting a lateral tilt angle of the ripper blade while moving underground; imaging, using an infrared camera of the distal end of the ripper assembly, the orientation of the polymer layer; and fabricating the polymer layer to have a desired orientation by controlling, using the CCS, the lateral tilt angle of the ripper blade while using the infrared imaging of the orientation.

In an embodiment, the method further comprises: storing thermoplastic polymer in a polymer storage container coupled to the body; melting the stored thermoplastic polymer into the molten polymer and supplying the molten polymer to the ripper arm using a polymer melting unit coupled to the body; storing the compressed air and supplying the stored compressed air to the ripper arm using a compressed air storage container coupled to the body; and supplying electric power to the robotic vehicle using a battery coupled to the body, wherein the robotic vehicle is self-contained and fabricates the polymer layer using the battery as its principal source of power.

In an embodiment, fabricating the polymer layer comprises: varying the fabrication depth of the polymer layer by adjusting a depth below the ground of the distal end of the ripper assembly while moving underground; and fabricating the polymer layer at a desired height above the underground structure by adjusting, using the CCS, the depth of the distal end of the ripper assembly.

In an embodiment, fabricating the polymer layer comprises: measuring a height of the fabrication depth above the underground structure using an ultrasonic sensor of the distal end of the ripper assembly; and controlling, using the CCS, the fabricating of the polymer layer at the desired height above the underground structure by using the measured height.

In an embodiment, fabricating the polymer layer comprises: measuring the fabrication depth using a depth gauge of the robotic vehicle; measuring a thickness of the polymer layer using an infrared camera of the distal end of the ripper assembly; fabricating, under control of the CCS, the polymer layer to have a desired thickness by using the measured thickness of the polymer layer; and generating, using the CCS, a thickness variation profile of the polymer layer by tracking the measured fabrication depth and the measured thickness of the polymer layer over time.

In an embodiment, fabricating the polymer layer comprises: generating, using the GPR, an elevation profile of distinct layers below the ground, the elevation profile including respective depth, thickness, and density measurements of the distinct layers, the distinct layers including the underground structure, the polymer layer, and a subsurface layer above the polymer layer; estimating, using the CCS, a subsurface load on the polymer layer by using the measured thickness and the measured density of the subsurface layer above the polymer layer; and setting, by the CCS, the desired thickness of the polymer layer based on the estimated subsurface load on the polymer layer.

In an embodiment, fabricating the polymer layer comprises: imaging a thermal distribution of a top surface of the polymer layer using an infrared camera; and verifying, by the CCS, thermal integrity of the polymer layer or adjusting, by the CCS, the fabricating of the polymer layer to improve the thermal integrity of the polymer layer using the imaged thermal distribution of the top surface of the polymer layer.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1:
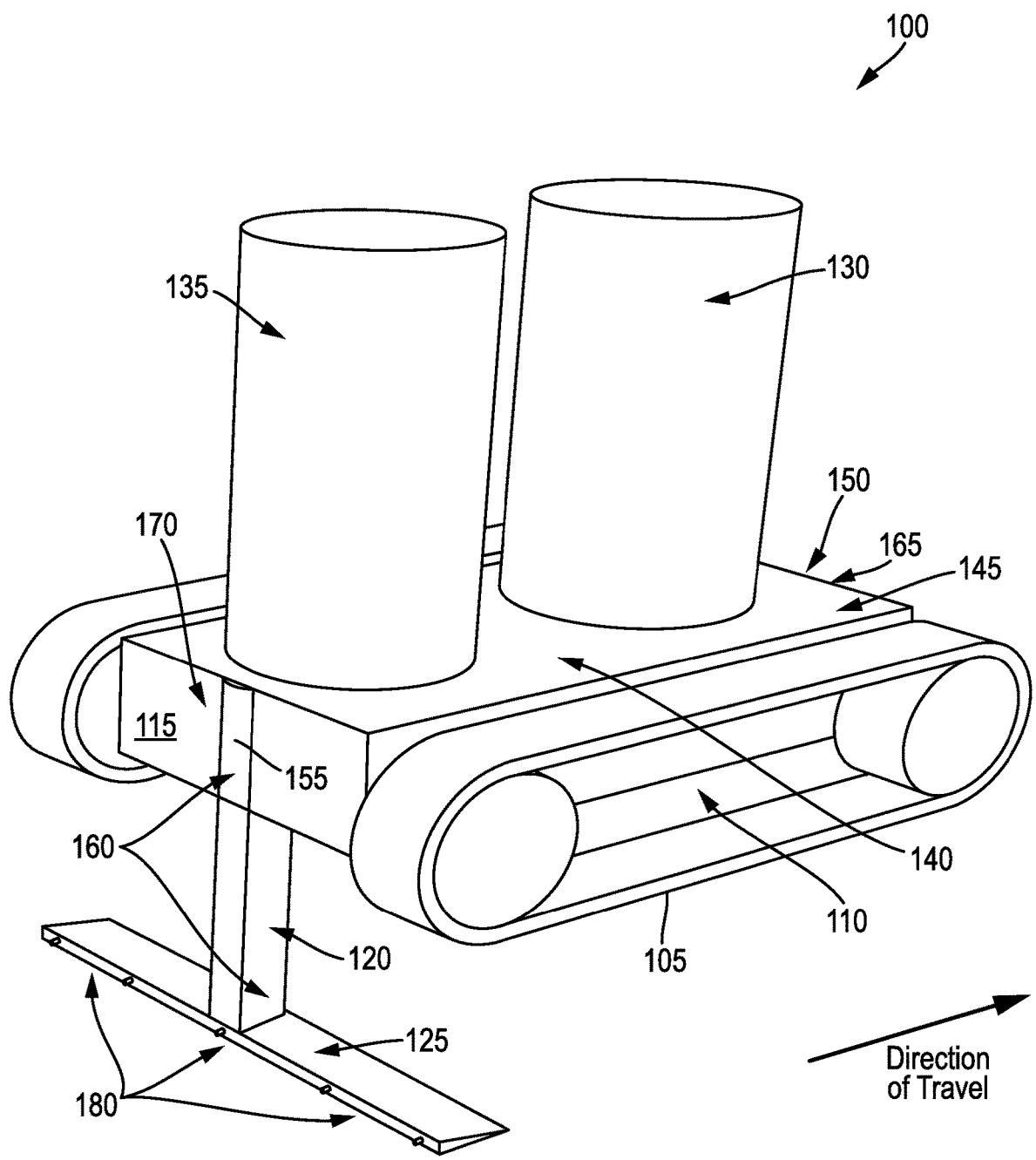
FIG. 1 is an illustration of an example self-contained robotic subsurface impact protection system, according to an embodiment.

In various example embodiments, a robotic subsurface impact protection system is provided for protecting buried or subsurface assets (such as hydrocarbon pipelines) from above-ground impact damage, and without the need for invasive and expensive trenching and back-filling. The robotic system makes use of a subsurface delivery apparatus to deliver thermoplastic polymer, such as high density polyethylene (HDPE), above the structure to be protected (and below the surface of the ground), thus effectively shielding the structure and protecting it from above-ground impact damage. In some embodiments, various techniques incorporate intelligent systems (such as robotics and sensors) into a robotic mechanized vehicle that is capable of delivering a continuous or semi-continuous stream of molten polymer consistently and uniformly below the surface while simultaneously providing information on the structure/integrity of the deposited polymer. The robotic and sensor systems incorporated into the subsurface delivery system allow it to operate autonomously or in a self-contained manner on various soft terrains with minimal input or outside intervention.

As discussed earlier, there are a number of problems associated with protecting underground structures from above-ground impact damage. While trenching and backfilling can be used to install protective structures, such as heavy duty concrete slabs, above the pipelines, this can be an expensive and invasive procedure. Another option is to increase the pipe thickness. However, this too is labor intensive and costly. Prefabricated HDPE plates can be used in lieu of concrete slabs to provide similar protection, but they still require trenching and back filling to install over existing pipelines.

Accordingly, in example embodiments, robotic subsurface delivery systems are provided to inject thermoplastic polymer over the underground structure to form a protective subsurface polymer layer and with a lower carbon footprint than with alternative approaches. In some such embodiments, continuous or semi-continuous molten polymer injection is used to deliver the polymer through a mechanized delivery system situated above-ground. The polymer is stored on or near a robotic vehicle and includes raw beaded polymer in tank(s). The raw polymer is melted and mechanically injected or threaded below the subsurface from above-ground to create an impact resistant barrier above the pipeline(s) to be protected. In one such embodiment, the robotic vehicle is self-contained or autonomous, and includes a computerized control system (CCS), a ground-penetrating radar (GPR), cameras, sensors, a height adjustable ripper arm, a tilt adjustable ripper blade, a power pack, storage tanks for thermoplastic polymer and compressed air, and a polymer melting unit. In a similar such embodiment, the robotic vehicle is semi-autonomous or not fully self-contained, having similar design features as the self-contained embodiment, only relying on external connections (e.g., umbilical cords, tubes) for the compressed air and molten polymer supply as well as the electric power supply.

As part of injecting the thermoplastic polymer, the injected polymer is heated to a generally fluid state. Optionally, the polymer is heated beyond the melting point in order to initially remain molten despite contact with unheated ground material. The melting point can vary significantly with the type of polymer. For instance, the melting point can lie in a temperature range that is between 120 degrees Celsius (° C.) and 260° C., which covers low melting point polymers such as polyethylene (PE) up to high melting point polymers such as polyethylene terephthalate (PET).

In example embodiments, the use of robotics and sensors include managing and tracking the rate of polymer deposition, robotic vehicle movement direction, velocity of robotic vehicle movement, and integrity of the delivered polymer. The CCS is configured by code to assess the tracking and control concurrently (e.g., simultaneously) in real-time, such as throughout the fabrication of the subsurface polymer layer. The CCS is further configured by code to adjust these variables depending on factors such as the nature of the terrain, concurrent feedback from onboard sensors, and the like. In some such embodiments, embedded sensors feed their measurements back into the robotics, which are programmed or otherwise configured to adjust these variables autonomously, including individually or simultaneously as appropriate. For ease of description, the concepts described throughout are with respect to buried pipelines, though they are equally applicable to other buried assets such as storage tanks. These techniques utilize robotics and sensors to track pipeline direction to deposit a layer of consistent and uniform polymer in the x, y, and z directions below ground and above the tracked pipeline. Here, x refers to the longitudinal (or pipeline length) direction, y refers to the lateral (or pipeline width) direction, and z refers to the vertical (or height or thickness) direction.

In further detail, the CCS includes one or more computers, processors, microprocessors, or other processing or logic circuits configured (e.g., by code, custom logic, or the like) to carry out the controlling of all of the other devices and systems on the robotic vehicle. The GPR is embedded in the robotic vehicle and, under control of the CCS, continuously locates and tracks the buried pipeline depth and direction using radar-driven location identification and navigation. This allows the robotic vehicle to function and protect the pipeline without need for pipeline plots, orientation, and documentation that is not always readily available. As such, the embedded GPR and CCS are configured or customized (e.g., by code) to assess and act on the factors or variables for locating and navigating the buried pipeline asset with an above-ground delivery system. For ease of description, the CCS is usually described throughout as a single computing device configurable by computer code (e.g., software) to carry out its assigned tasks, but its actual implementation can extend to multiple devices configurable by, for example, software, firmware, custom logic, or combination thereof.

In some embodiments, cameras (such as visible spectrum cameras) are embedded above and below the robotic vehicle to provide visual direction wirelessly to nearby or remote operators of the robotic vehicle. In addition, infrared cameras are mounted below the surface (such as on the ripper blade) to provide thermal imaging confirmation that the fabricated polymer layer is being deployed adequately and consistently. In some embodiments, sensors are embedded on the robotic vehicle and subsurface ripper blade that continuously assess the amount of polymer being deposited below the surface to ensure equal distribution, consistency, and continuity in the deposited polymer layer. For example, some sensors measure the robotic vehicle's velocity and rate of polymer deposition, with the CCS being programmed to adjust these variables based on information retrieved from the embedded sensors.

In some embodiments, the robotic vehicle includes a height adjustable ripper arm, that adjusts in height to vary the fabrication depth of the polymer layer, such as to maintain a consistent height over the underground pipeline. In some such embodiments, the CCS is configured by code to adjust the height of the ripper arm based on real-time data from the GPR. Here, the GPR continuously detects (e.g., measures or otherwise senses) the depth of the buried pipeline, and the CCS is configured by code to adjust the ripper arm height automatically in order to ensure that the deposited polymer layer is approximately 0.5 meters (or other set distance) above the pipeline. In some embodiments, the robotic vehicle includes a tilt adjustable ripper blade at the end of the ripper arm. The ripper blade is adjustable (e.g., capable of being tilted) in the x, y, and z directions based on real-time data from the embedded GPR and other sensors. This facilitates ease of movement for the robotic vehicle to deliver its polymer load in any direction depending on the orientation of the buried pipeline.

In some embodiments, the robotic vehicle (RV) itself is an autonomous or semi-autonomous robotically-controlled vehicle under control of the CCS with minimal or no human input. The RV's control system features computer-controlled movement, velocity, and rate of polymer deposition. In some such embodiments, the RV's computerized control system (CCS) is configured by code to link the GPR, on-board sensors, and the ripper control mechanisms to a central processing unit (CPU) with a feedback loop to ensure all aspects of the system work in tandem to deliver the subsurface polymer layer having a desired size, shape, and location. In some embodiments, the RV includes a power pack (e.g., battery pack) to power the whole system independently, including making it autonomous or self-contained. However, in some other embodiments, the RV is powered with an umbilical from a mobile power unit or generator. In some embodiments, the RV includes raw polymer and compressed air storage tanks. In some other embodiments, the molten polymer and compressed air are fed through mobile tanks on trucks or other vehicles through umbilical cords directly to the RV. For instance, this can save space on the RV itself for additional sensors or auxiliary equipment.

In some embodiments, the robotic system is deployed autonomously as a self-contained RV, with all of the sensors, computers, mechanics, batteries, and raw materials located on or within the RV itself. In such embodiments, possible limitations to the RV system include the size of the battery pack and the amounts or quantities of compressed air and raw polymer that the RV can hold. Such embodiments are ideal for short distance pipelines or other small buried assets where protection through rapid deployment is desired or required. In some other embodiments, the robotic system is deployed semi-autonomously or not as a self-contained RV. For instance, in some such embodiments, the RV includes all of the above features, except for the power supply, the compressed air supply, and the raw polymer tanks. Here, the electric power, compressed air, and molten polymer are instead provided independently of the RV, such as through umbilical cords from independent or mobile storage tanks or vehicles in close proximity to the RV. Such embodiments are ideal for long distance pipelines where resources can be mobilized in a timely manner to provide the desired protection.

For either self-contained or not self-contained embodiments, the molten polymer is deployed/deposited/injected below the surface of the ground through the delivery system on a continuous basis (e.g., continuous polymer injection, to fabricate one continuous polymer layer) or on a semi-continuous basis (e.g., to form a linear array of subsurface polymer slabs). Compressed air is also injected or otherwise deployed below ground to, for example, create cavities in the subsurface for the molten polymer.

Figure 2:
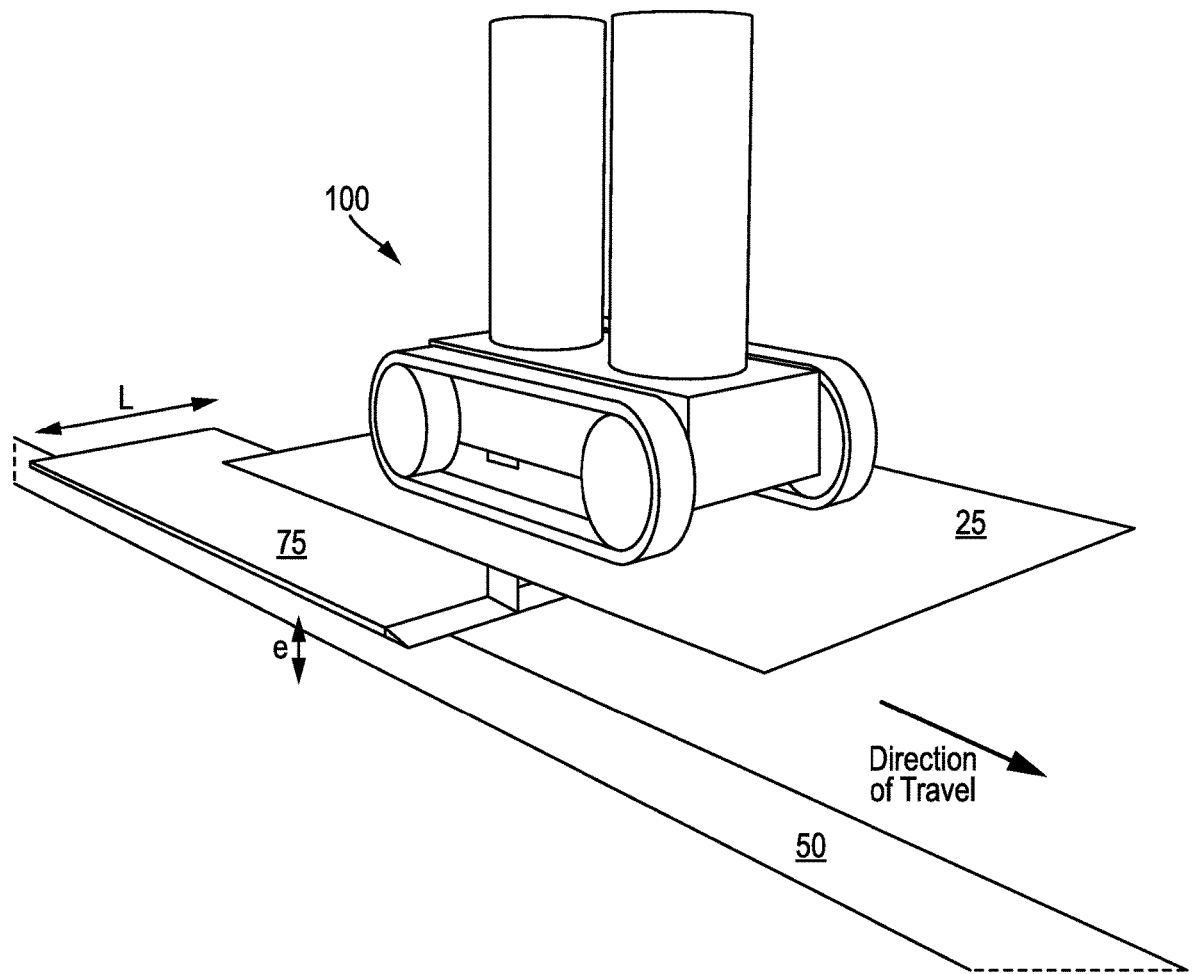
FIG. 2 is an illustration of the self-contained robotic subsurface impact protection system of FIG. 1 in an example deployment, injecting polymer at a desired depth and shape below ground to form a subsurface polymer layer that protects an underground hydrocarbon pipe, according to an embodiment.

FIG. 1 is an illustration of an example self-contained robotic subsurface impact protection system 100 (or apparatus), according to an embodiment. FIG. 2 is an illustration of the self-contained robotic subsurface impact protection system 100 of FIG. 1 in an example deployment, injecting polymer at a desired depth and shape below ground 25 to form a subsurface polymer layer 75 that protects an underground hydrocarbon pipe 50, according to an embodiment.

FIG. 1 shows the basic concept of the trenchless polymer subsurface delivery system or apparatus 100 in a fully autonomous or self-contained mode or configuration, while FIG. 2 illustrates the apparatus 100 in operation. The apparatus 100 has a front on the right side of FIG. 1, and a back on the left side of FIG. 1 (and similarly for FIG. 2). The apparatus 100 moves in the direction of the front (as marked in FIGS. 1-2), with most of the apparatus being above the ground 25 during deployment of the subsurface polymer layer 75.

The system 100 of FIG. 1 includes a polymer bead silo 130 for storing raw polymer beads, such as commercially available HDPE beads. The beads can be transported to the site, ready to be used on the subsurface delivery system 100 by filling the polymer bead silo 130. The apparatus 100 shown in FIG. 1 is an autonomous mechanical robotic system 100 for the subsurface trenchless delivery of molten polymer. Once injected or otherwise deployed, the polymer forms an efficient underground protective impact resistant barrier (such as polymer layer 75) of buried structures (such as hydrocarbon pipe 50), such as against accidental third-party damage (e.g., by an excavator). Buried structures of any sort, such as pipelines, electric cabling, fiber optics, and the like may be protected from such a system 100. While oil & gas and petrochemical industries can benefit from such a system 100, anything that is buried and needs protection from above-ground third party impact damage can utilize this system 100, such as, for example, fiber optic cables, sewage lines, gas/water mains, to name a few. The system 100 provides for rapid automated deployment to protect buried assets from above-ground impact damage.

The apparatus 100 as shown in FIG. 1 includes the following primary parts: a silo 130 to contain commercially available polymer beads, a compressed air tank 135, a mechanized robotic vehicle 110 (including a body 115 that moves from one location to another using one or more rotatable members, in this case two treads 105), a polymer melting unit 140, a subsurface height adjustable ripper arm 120 (with corresponding depth gauge 155) and tilt adjustable ripper blade 125, a transmission/feed system to feed the molten polymer and compressed air to the bladed ripper 125, a ground penetration radar 170, back cameras 160 and a front camera 165, ripper blade sensors 180, a computerized control system 150, and a battery/auxiliary pack 145. The apparatus 100 incorporates a network of sensors (including infrared camera 160, GPR 170, and ultrasonic sensor 180 embedded into the robotic vehicle 110. These sensors, in combination with CCS 150, not only provide valuable information and data on the structure/integrity of the deposited polymer but also provide for autonomous operation in a given environment. The apparatus 100 of FIG. 1 is efficient and can be rapidly deployed in most soft earth/soil/sand environments, thus providing adequate protection of buried assets from third party impact damage.

With reference to FIG. 1, in an example embodiment, a robotic vehicle (such as robotic vehicle 110) for moving above ground (such as ground 25) while fabricating a subsurface polymer layer (such as a sheet of HDPE) to protect an underground structure (such as a buried pipeline, e.g., hydrocarbon pipe 50) is provided. The robotic vehicle includes a body (such as body 115) for moving over the ground, and a rotational member (such as a roller, a wheel, or a tread, as in tread 105) coupled to the body. The rotational member contacts the ground and moves the body over the ground (e.g., propels and turns, such as by an electric motor and actuators) during the fabricating of the subsurface polymer layer. That is, the polymer layer (such as the sheet of HDPE, e.g., injected polymer sheet 75) is fabricated while the body is moving. In an embodiment, the polymer layer is fabricated as a sequence of polymer sheets or blocks, with gaps in between sequential sheets or blocks.

Continuing with FIG. 1, the robotic vehicle further includes a ripper assembly (such as ripper arm 120 and ripper blade 125) having a proximal end (such as the top of ripper arm 120) coupled to the body above ground, and a distal end (such as ripper blade 125, or the bottom of ripper arm 120) below ground. The proximal end moves with the body, while the distal end moves underground at a fabrication depth in response to the movement of the proximal end while fabricating the polymer layer. For example, the ripper assembly can have a bladed structure, tapering to a front edge in the movement direction to cut and move through the subsurface layers. The expanding rear surface creates a volume (e.g., triangular prism shape) useful for wires, sensors, and conduits for transferring raw materials (such as compressed air and molten polymer) from the body to the rear of the distal end of the ripper assembly, in order to form the polymer layer at the fabrication depth below ground.

The robotic vehicle further includes a ground penetrating radar (GPR, such as GPR 170) that locates and measures a depth of the underground structure below the ground during the fabricating of the polymer layer, and a computerized control system (CCS, such as CCS 150) that is configured by code to protect the underground structure by controlling the rotational member, the distal end of the ripper assembly, and the GPR to move the body over the located underground structure while tracking the location of the underground structure and fabricating the polymer layer at the fabrication depth and above the measured depth of the underground structure. For instance, with reference to FIG. 1, the CCS 150 is configured by code to control the treads 105 to move and steer the robotic vehicle 110 to stay over and move in the direction of the buried pipeline (as located by the GPR 170) while the ripper blade 125 injects compressed air and molten polymer into the ground at the fabrication depth to form the polymer layer. Here, the fabrication depth is above the buried pipeline. For example, compressed air can be injected to form cavities in the subsurface, and the molten polymer can be injected into the formed cavities to fabricate the polymer layer.

In one embodiment, the ripper blade is adjustable in longitudinal tilt angle while moving underground, in order to vary the fabrication depth during the fabricating of the polymer layer. In addition, the CCS is configured by code to control the fabricating of the polymer layer at a desired height above the measured depth of the underground structure by controlling the longitudinal tilt angle of the ripper blade during the fabricating of the polymer layer. For instance, tipping the ripper blade downward causes the ripper blade (and fabrication depth) to move deeper underground as the ripper blade moves through the ground, while tipping the ripper blade upward has the opposite effect.

In one embodiment, the ripper blade is adjustable in lateral tilt angle while moving underground, in order to vary an orientation of the fabricated polymer layer during the fabricating of the polymer layer. In addition, the distal end of the ripper assembly includes an infrared camera (such as infrared camera 180 on the bottom of ripper arm 120) that images the orientation of the polymer layer during the fabricating of the polymer layer. The CCS is configured by code to control the fabricating of the polymer layer to have a desired orientation by controlling the lateral tilt angle of the ripper blade while using the infrared imaging of the orientation during the fabricating of the polymer layer. As such, the CCS is configured by code to correct for any lateral tilting of the fabricated polymer layer, by adjusting the lateral tilt of the ripper blade 125.

In one embodiment, the robotic vehicle further includes a polymer storage container (such as polymer bead silo 130) coupled to the body and that stores thermoplastic polymer (such as HDPE beads), a polymer melting unit (such as polymer melting unit 140) coupled to the body and that melts the stored thermoplastic polymer into the molten polymer and supplies the molten polymer to the ripper arm, a compressed air storage container (such as compressed air tank 135) coupled to the body and that stores the compressed air and supplies the stored compressed air to the ripper arm, and a battery (such as battery pack 145) coupled to the body and that supplies electric power to the robotic vehicle. Here, the robotic vehicle is self-contained and moves and fabricates the polymer layer using the battery as its principal source of power. For instance, the robotic vehicle is electric powered, having an electric motor, an electric melting unit, an electric air compressor, and electronics (GPR, CCS, and sensors) that run directly or indirectly off the battery. This does not preclude the availability of other, relatively minor, sources of power, such as emergency backup batteries or small solar panels.

In one embodiment, the distal end of the ripper assembly is adjustable in depth below the ground while moving underground to vary the fabrication depth during the fabricating of the polymer layer. For example, the ripper arm can adjust in length or extension (e.g., telescoping), or can raise or lower (e.g., exposing more of the arm above ground during raising, and burying more of the arm below ground during lowering). In addition, the CCS is configured by code to control the fabricating of the polymer layer at a desired height above the underground structure by adjusting the depth of the distal end of the ripper assembly during the fabricating of the polymer layer. To this end, in one embodiment, the distal end of the ripper assembly includes an ultrasonic sensor (such as ultrasonic sensor 180) that measures a height of the fabrication depth above the underground structure during the fabricating of the polymer layer. Furthermore, the CCS is configured by code to control the fabricating of the polymer layer at the desired height above the underground structure by using the measured height during the fabricating of the polymer layer.

In one embodiment, the robotic vehicle further includes a depth gauge (such as depth gauge 155) that measures the fabrication depth (e.g., the extension or the lowering of the ripper arm, such as with an encoder) during the fabrication of the polymer layer. In addition, the distal end of the ripper assembly includes an infrared camera (such as one or more infrared sensors 180 deployed along the ripper blade) that measure a thickness of the polymer layer during the fabricating of the polymer layer. To this end, the CCS is configured by code to control the fabricating of the polymer layer to have a desired thickness by using the measured thickness of the polymer layer during the fabricating of the polymer layer. Further, the CCS is configured by code to generate a thickness variation profile of the polymer layer by tracking the measured fabrication depth and the measured thickness of the polymer layer over time during the fabricating of the polymer layer.

In one embodiment, the GPR is configured to generate an elevation profile of distinct layers below the ground during the fabricating of the polymer layer. Here, the elevation profile includes respective depth, thickness, and density measurements of the distinct layers. There can be many distinct layers, including the underground structure, the polymer layer, one or more subsurface layers above the polymer layer, and one or more subsurface layers between the underground structure and the polymer layer. To this end, the CCS is configured by code to estimate a subsurface load on the polymer layer during the fabricating of the polymer layer by using the measured thickness and the measured density of each of the subsurface layers above the polymer layer. In addition, the CCS is configured by code to set the desired thickness of the polymer layer during the fabricating of the polymer layer based on the estimated subsurface load on the polymer layer.

In one embodiment, the robotic vehicle further includes an infrared camera (such as infrared camera 160) that images a thermal distribution of a top surface of the polymer layer during the fabricating of the polymer layer. In addition, the CCS is configured by code to use the imaged thermal distribution of the top surface of the polymer layer in order to verify the thermal integrity of the polymer layer, or as feedback to adjust the fabricating of the polymer layer in order to improve the thermal integrity of the polymer layer.

Figure 3:
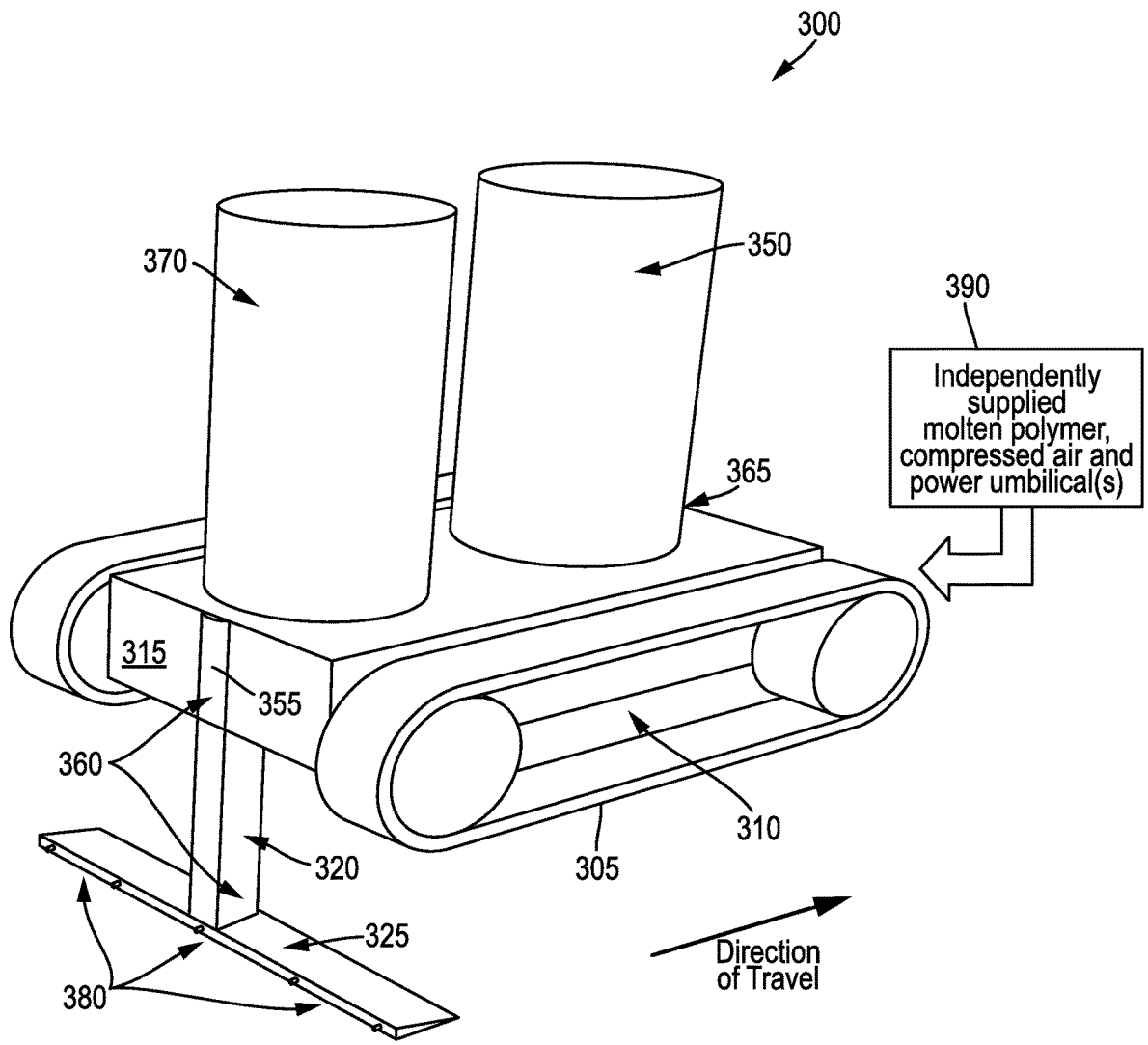
FIG. 3 is an illustration of an example robotic subsurface impact protection system, according to an embodiment.

FIG. 3 is an illustration of an example robotic subsurface impact protection system 300, according to an embodiment. The system 300 is similar in structure and operation to the apparatus 100 of FIG. 1, only unlike the apparatus 100, the system 300 is not a self-contained system. Rather, the robotic vehicle 310 of FIG. 3, including tread 305, body 315, ripper arm 320, ripper blade 325, CCS 350, depth gauge 355 cameras 360 and 365, GPR 370, and sensors 380 (all of which can be similar to the similarly-named components of apparatus 100), includes independently supplied molten polymer, compressed air, and power umbilical(s) 390. The umbilical cords 390 can be connected to separate vehicles or nearby stockpiles or sources that provide the robotic vehicle 310 with the molten polymer, compressed air, and electric power needed to operate the robotic vehicle 310 and fabricate the polymer layer below ground at the desired fabrication depth. Further description of the system 300 is similar to that of the apparatus 100 of FIGS. 1-2, and will not be repeated.

According to various embodiments, such as robotic subsurface impact protection systems 100 and 300 of FIGS. 1-3, the polymer layer can be fabricated below ground without having to dig a trench and back fill it, as required with corresponding concrete and polymer slab technologies. Such systems can also be fully autonomous or self-contained (as in apparatus 100) or can be semi-autonomous or not self-contained (as in system 300). Such systems can save costs and time (e.g., from not having to perform digging and back filling), and the work can be done with minimal human input, which further saves costs and resources.

According to some embodiments, the functions of the onboard sensors are primarily two-fold: to track and locate the buried asset (pipeline) via the GPR, and to assess the integrity of the deposited polymer layer through the sensors mounted on, for example, the ripper blade and ripper arm. The CCS is configured by code to use the data received from the onboard sensors in order to determine the velocity of the robotic vehicle, the rate of deposition of the polymer, and the clearance distance to deposit the polymer layer above the pipeline. This allows the system or apparatus to fabricate the polymer layer to have the desired shape and location to protect the underground asset, and without trenching and back filling.

In some embodiments, the robotic subsurface impact protection system includes several sensor or camera systems installed that operate under control of the CCS, which is configured by code to assess and assure the quality of the injected polymer layer. This validation system is built to mainly assess four targeted criteria: 1) the positioning of the robotic vehicle, 2) the shape and dimensions of the injected polymer, 3) the strength of the polymer layer against vertical loads, and 4) the thermal deformation of the polymer layer.

Figure 4:
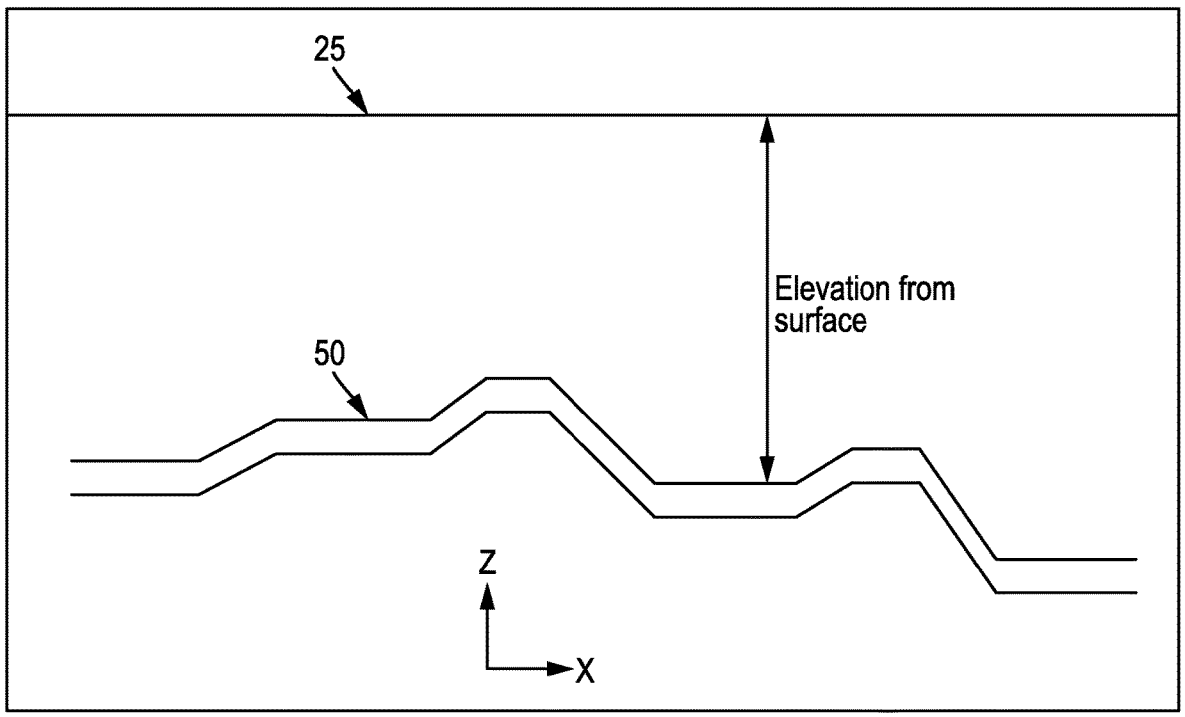
FIG. 4 is a longitudinal cross-sectional view of an example environment for deploying a robotic subsurface impact protection system, according to an embodiment.
Figure 5:
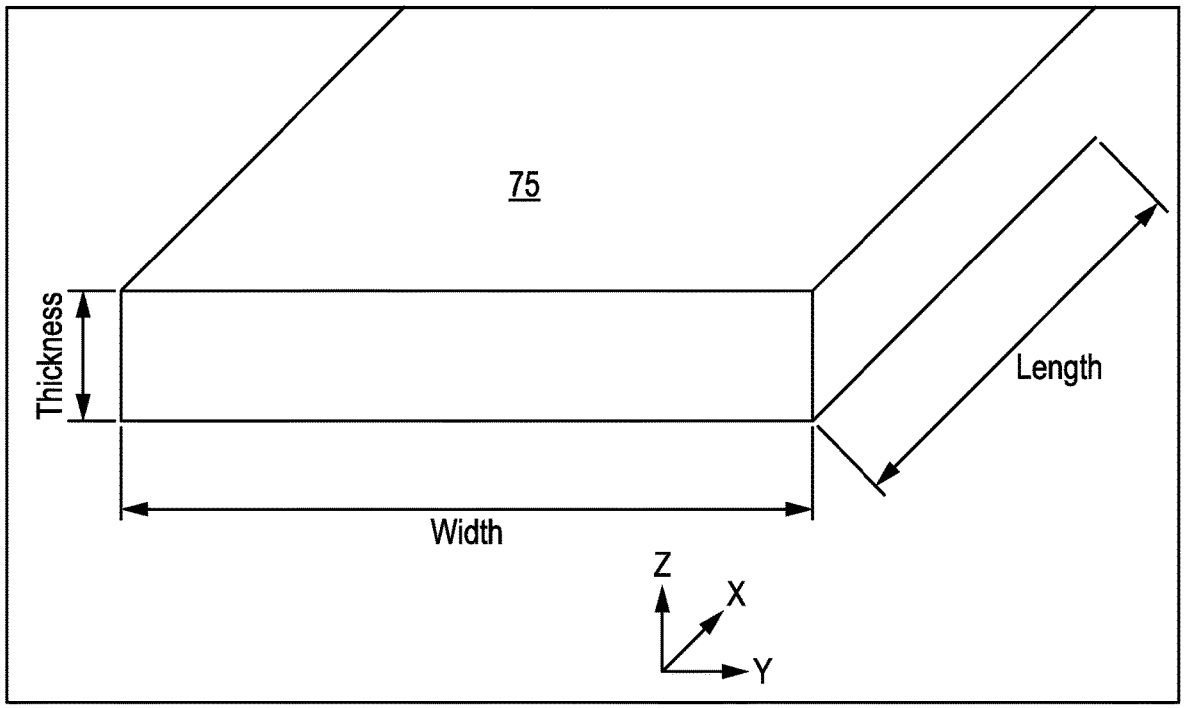
FIG. 5 is an oblique view of an example injected polymer layer formed by a robotic subsurface impact protection system, according to an embodiment.

FIG. 4 is a longitudinal cross-sectional view (or elevation profile) of an example environment for deploying a robotic subsurface impact protection system (such as systems 100 or 300), according to an embodiment. It should be noted in FIG. 4, the pipe 50 that is to be protected varies in elevation from the surface 25, proceeding longitudinally (lengthwise) along the pipe 50. FIG. 5 is an oblique (three dimensional, or 3D) view of an example injected polymer layer 75 formed by a robotic subsurface impact protection system, according to an embodiment.

To better illustrate and describe these and other drawings, three-dimensional coordinate references x, y, and z are chosen as part of a unified coordinate reference system to describe dimensions relative to the polymer layer 75 and its relationship to the surface 25 and the pipe 50. Here, the z-direction is aligned with the thickness of the polymer layer 75 and the elevation of objects from the surface 25 (e.g., a gravity direction), the x-direction is aligned with the length of polymer layer 75 and the pipe 50 (longitudinal dimension), and the y-direction is aligned with the width of the polymer layer 75 and the pipe 50 (lateral dimension).

The positioning of the robotic subsurface impact protection system vehicle (or robotic vehicle, for short) is to be aligned above ground with that of the buried pipeline below ground. To this end, it should be noted that there is usually data regarding the location and elevation of pipelines that is available prior to the construction and installation phases of any given pipeline. As such, it is possible to use this data to locate the pipeline and position the robotic vehicle approximately above the pipes. However, construction data is not in a sufficient form or detail to provide accurate guidance as to where to deposit the polymer layer or to adjust the arm while the vehicle moves along the pipe. Accordingly, in some embodiments, a continuous verification system is used to ensure the robotic vehicle is moving on track along the pipe (e.g., in alignment with the pipe below ground), with safety margins taken into consideration to adjust the height of the ripper arm. To this end, in some such embodiments, a combination of GPR and ultrasound sensors are installed in the robotic vehicle to provide guidance.

For example, a GPR can be installed (such as in the rear of the robotic vehicle) to monitor and track the location of the underground pipe shortly before forming the polymer layer and shortly after forming the polymer layer. In this way, the GPR can be used to both ensure the polymer layer is formed in the correct location and verify that is formed to the desired shape and integrity in a continuous feedback approach under control of the CCS. The electromagnetic radiation from the GPR is usually used in the geophysical field as a nondestructive method to detect subsurface structures. However, this device is not only utilized in the robotic vehicle to detect the pipe, but also to deliver those signals to the onboard computer processing system (CPS, also referred to as computerized control system or CCS throughout). The CPS is configured by code to monitor and control (e.g., through treads, rollers, wheels, or other rotational movement members) the movement of the robotic vehicle to ensure that the robotic vehicle moves in alignment with the pipe.

In addition, ultrasound sensors can be installed (such as at the fabrication depth of the ripper assembly) to detect objects by emitting sound waves towards the objects (which then reflect off the objects) and then calculate the distances of the objects based on the time required to receive the reflected sound waves. In general, ultrasound sensors provide more accurate measurements than GPR devices. Moreover, in some embodiments, the ultrasound sensors are installed on the ripper blade because it is the closest location of the robotic vehicle apparatus to the underground structure (e.g., the pipe) being protected. This helps to ensure that the distance measurements are taken as accurately and precisely as possible. These measurement data are then delivered to the onboard CPS, which is configured by code to calculate the required or desired height for the ripper blade arm to move and stay above the pipe, and below the surface.

The shape of the injected polymer and dimensions of the polymer layer is governed by several factors, such as the shape of the injection device (e.g., ripper blade or distal end of the ripper assembly), speed of the robotic vehicle, injection rate of the injection device, and soil type and conditions, to name a few. In some embodiments, as fabricated by the ripper assembly of the robotic vehicle, the length of the polymer layer is a function of how long and how far the robotic vehicle travels while fabricating the same section of polymer layer. However, the width and thickness dimensions are controlled differently.

Figure 6:
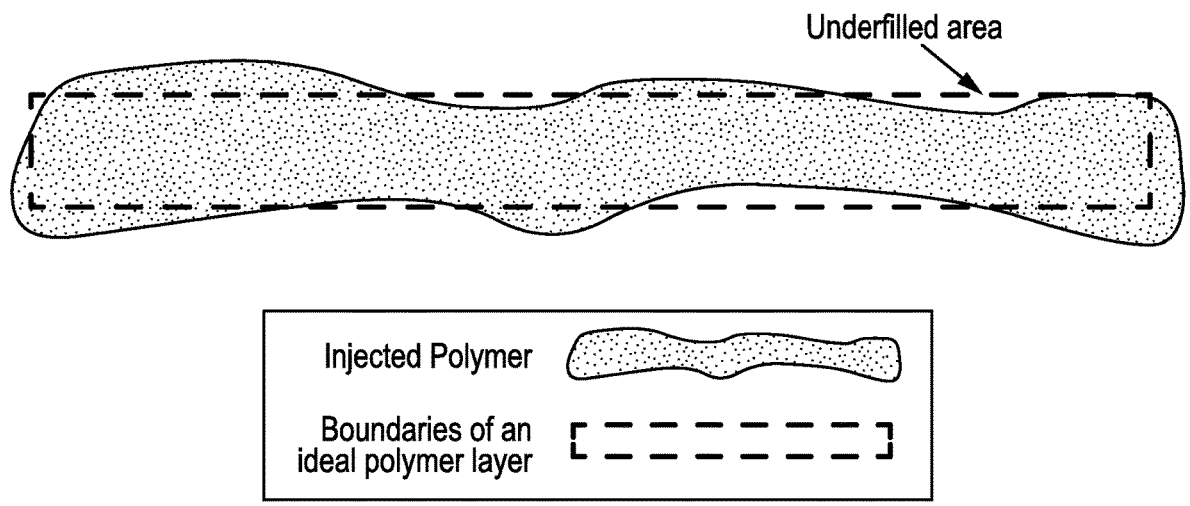
FIG. 6 is a lateral cross-sectional view of an example measured cross-section of injected polymer during fabrication of the polymer layer by a robotic subsurface impact protection system, according to an embodiment.

FIG. 6 is a lateral cross-sectional view of an example measured cross-section of injected polymer during fabrication of the polymer layer by a robotic subsurface impact protection system, according to an embodiment. FIG. 6 illustrates an example possible polymer formation taken by an infrared camera.

With regard to the width and thickness dimensions of the polymer layer, given that the subsurface objects are not exposed to light, the use of infrared cameras can be beneficial. To this end, in some embodiments, a video infrared camera is installed on the ripper arm at the injection point in order to continuously capture the temperature of the (cooling) polymer layer while the molten polymer is being injected into the subsurface. In some such embodiments, numerous infrared cameras are distributed along the injection portion of the ripper blade.

Since the polymer is injected at a different temperature from its surroundings, it is possible to capture its shape by recognizing the temperature differences using the infrared imaging. As such, the infrared camera(s) captures the front or cross-sectional shape of the polymer sheet, allowing the camera and CPS to determine the sheet thickness and width from the captured cross-sectional infrared images. This feeds into the CPS, which is configured by code to compare the imaged cross section with the desired or ideal parameters to identify areas of over or under fillings. In some such embodiments, the robotic vehicle does not move until the desired cross section of molten polymer has injected and all underfilled areas have been addressed.

Figure 7:
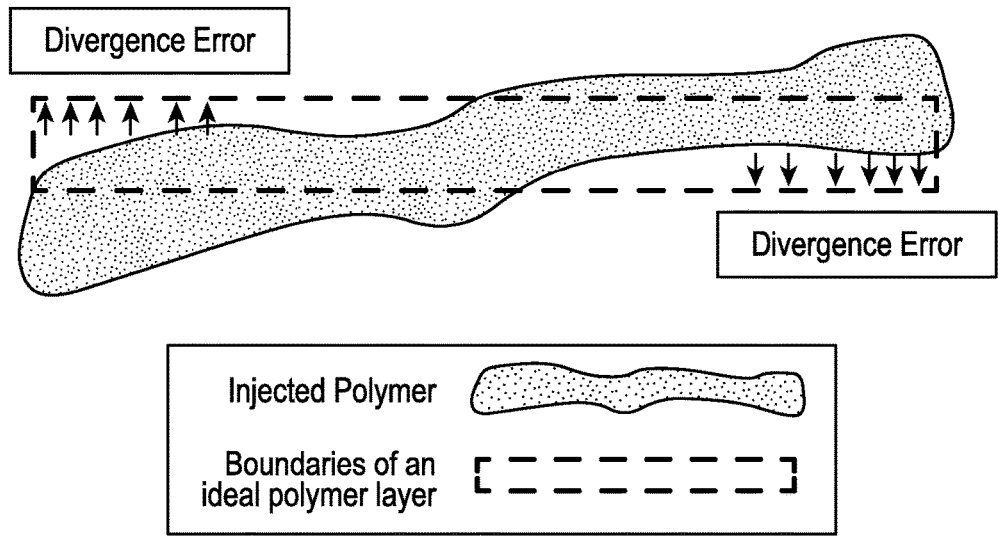
FIG. 7 is a lateral cross-sectional view of another example measured cross-section of injected polymer during fabrication of the polymer layer by a robotic subsurface impact protection system, according to an embodiment.

FIG. 7 is a lateral cross-sectional view of another example measured cross-section of injected polymer during fabrication of the polymer layer by a robotic subsurface impact protection system, according to an embodiment. FIG. 7 illustrates an example polymer layer formation taken by an infrared camera showing angular (lateral tilt) divergence errors.

With regard to the orientation of the polymer sheet, the ripper blades are subject to angular variation when operating the ripper assembly of the robotic vehicle below ground and near the pipes due to the flexible nature of the ripper blades. In some embodiments, an infrared camera is centered in the ripper arm (a static part), and is therefore not subject to the same angular variation. The infrared imaging from this camera can be used to capture the front cross section of the polymer layer (as described above and illustrated in FIG. 7) to identify the overall orientation (e.g., lateral tilt) of the polymer layer.

With reference to FIG. 7, this identification or verification can be conducted by comparing the corners of the captured infrared image with the projection of the ideal polymer layer boundaries (e.g., without any tilt). The CPS is configured by code to calculate the angular divergence and send orders to the ripper blade to adjust its angle accordingly. To this end, the ripper blade is adjustable in lateral tilt angle while moving underground in order to correct for such divergence errors. As such, in some embodiments, the CPS is configured by code to minimize the movement of the robotic vehicle while controlling the ripper blade to adjust its lateral tilt in order to achieve a desired cross section and fill any or most of the gaps caused by the divergence error with the molten polymer.

Figure 8:
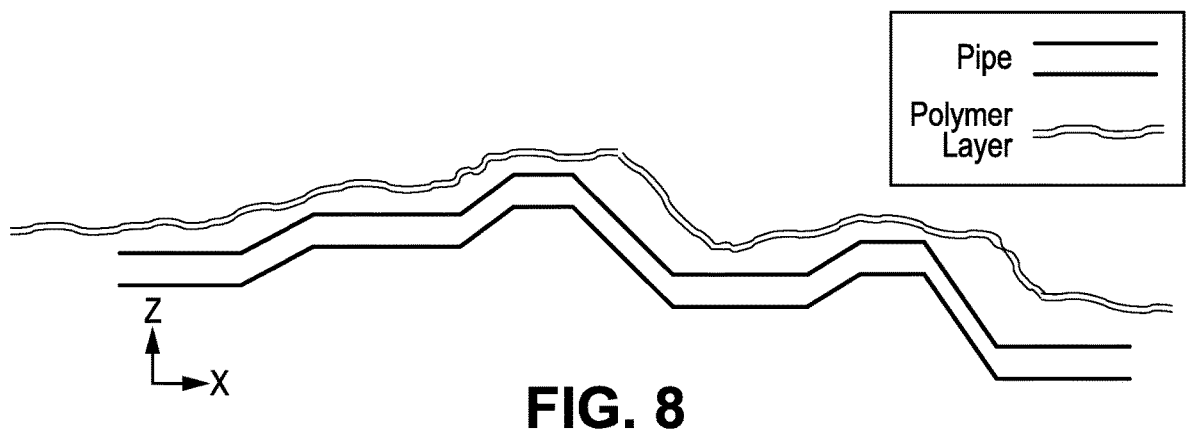
FIG. 8 is a longitudinal cross-sectional view of an example injected polymer layer protecting an underground pipe, as fabricated by a robotic subsurface impact protection system, according to an embodiment.

FIG. 8 is a longitudinal cross-sectional view of an example injected polymer layer protecting an underground pipe, as fabricated by a robotic subsurface impact protection system, according to an embodiment. FIG. 8 illustrates an example vertical variation of the pipe and polymer layer.

With regard to vertical dimensions and elevation profile validation of the fabricated polymer layer, it can be important to define the elevation profile and the shape variation of the polymer layer, such as the height variation (in Z direction) along the distance (in X direction), after being injected. Because of the robotic vehicle, and in particular the ripper blade or other components of the ripper assembly, this can be measured far more easily and accurately during fabrication of the polymer layer than afterwards using surface-based instrumentation or tools. The elevation profile plays a key role when assessing the strength of the polymer layer and the effect of the distributed loads that act on it. For such purposes, in some embodiments, a GPR and a video infrared camera are utilized to define the elevation and shape of the fabricated layer.

For example, in some such embodiments, the GPR is used to detect all subsurface objects including the pipe structure and the protective polymer sheet. From this, an approximate shape of the elevation profile and the vertical dimensions of the injected polymer sheet by the robotic vehicle can be determined by the GPR under control of the CPS, as illustrated in FIG. 8.

Figure 9A:
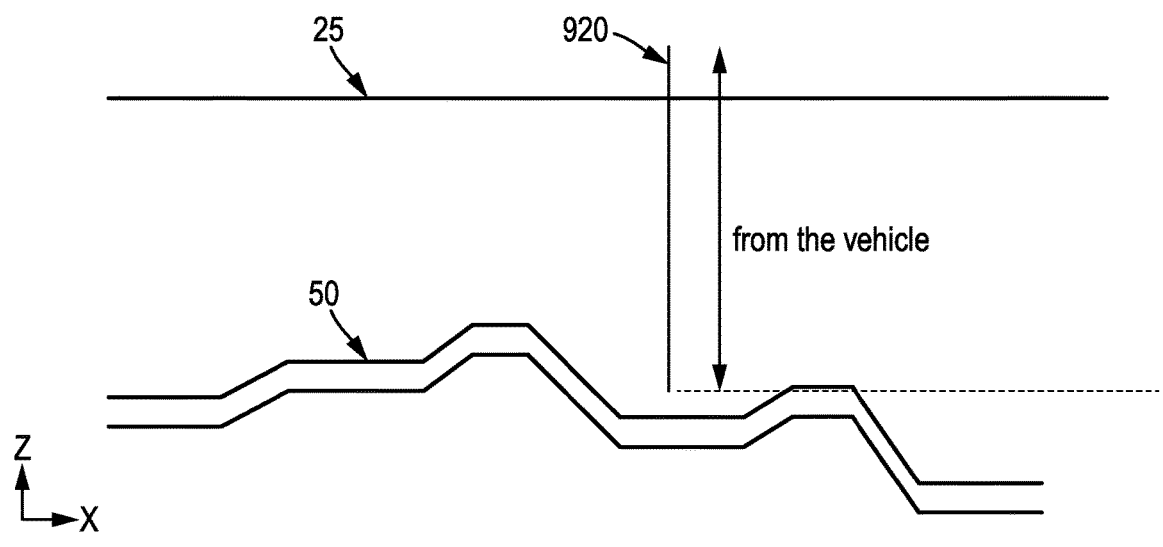
FIG. 9A is a longitudinal cross-sectional view of an example polymer layer being fabricated by a robotic subsurface impact protection system to protect an underground pipe, according to an embodiment.
Figure 9B:
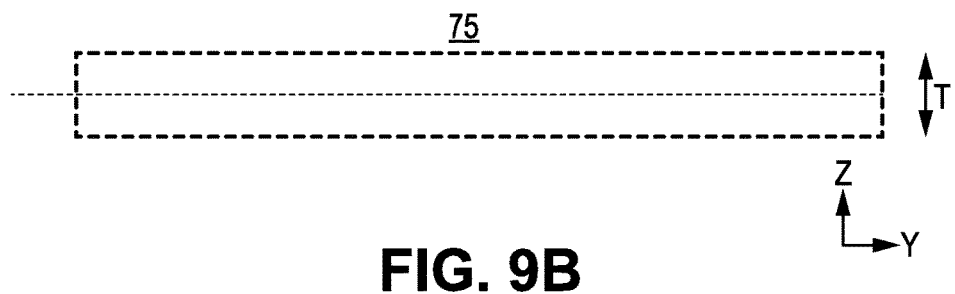
FIG. 9B is a lateral cross-sectional view of an example cross-section of injected polymer during the fabrication of the polymer layer of FIG. 9A, according to an embodiment.

FIG. 9A is a longitudinal cross-sectional view of an example polymer layer 75 being fabricated by a robotic subsurface impact protection system to protect an underground pipe 50, according to an embodiment. FIG. 9B is a lateral cross-sectional view of an example cross-section of injected polymer during the fabrication of the polymer layer 75 of FIG. 9A, according to an embodiment. Together, FIGS. 9A-9B illustrate the input data, namely the length H of the ripper arm 920 below the surface 25 (e.g., fabrication depth) and the thickness T of the polymer layer 75, to generate the vertical variation profile for the polymer layer 75.

Figure 10:
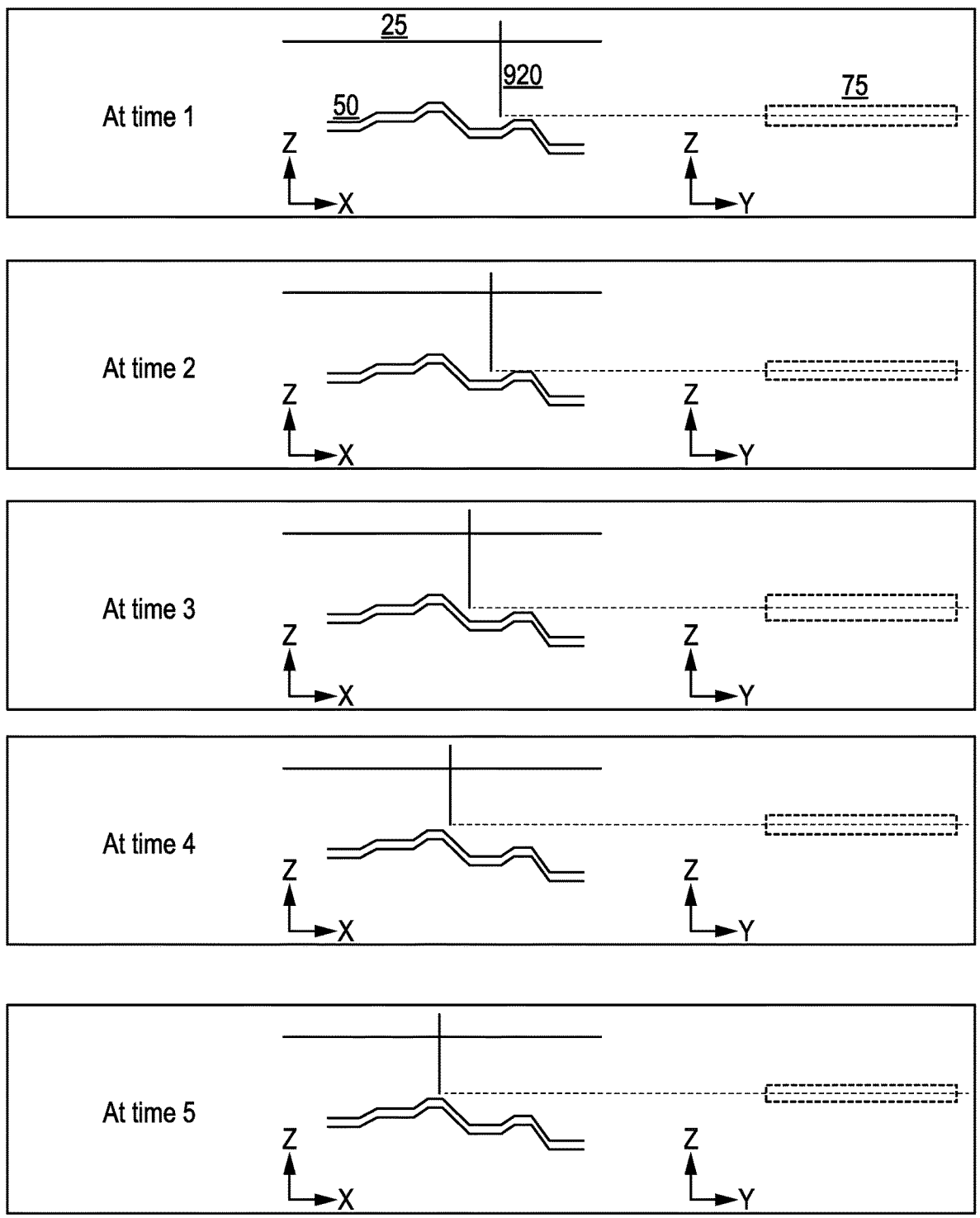
FIG. 10 is a series of longitudinal cross-sectional views of an example polymer layer being fabricated by a robotic subsurface impact protection system to protect an underground pipe, along with corresponding lateral cross-sectional views of an example cross-section of injected polymer during the fabrication of the polymer layer, according to an embodiment.
Figure 11A:
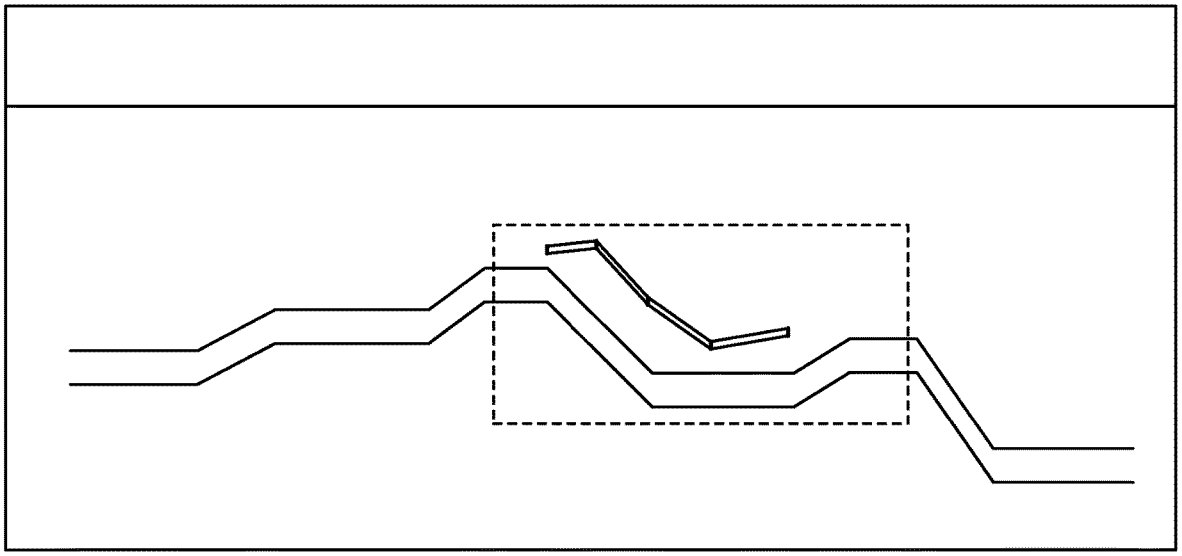
FIG. 11A is a longitudinal cross-sectional example composite view of the injected polymer layer of FIG. 10 protecting the underground pipe, as fabricated by a robotic subsurface impact protection system, according to an embodiment.
Figure 11B:
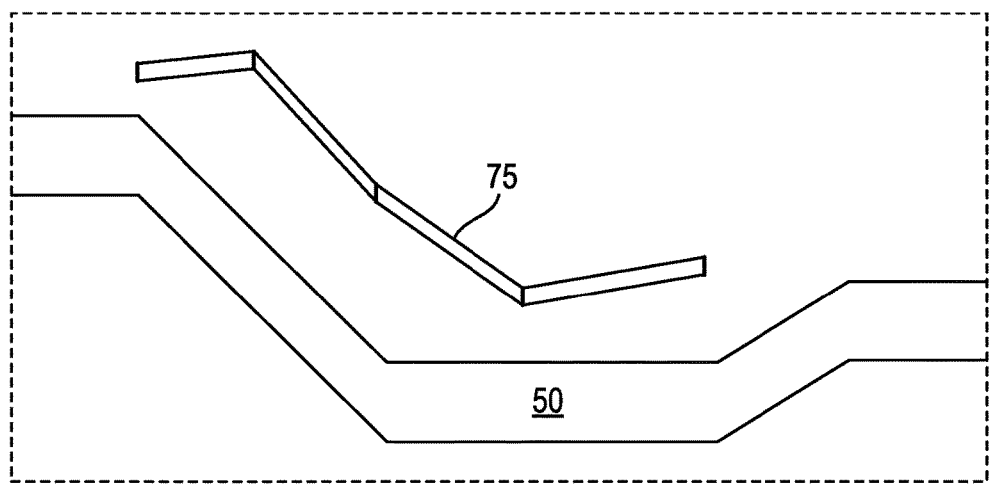
FIG. 11B is an enlarged view of the injected polymer layer and pipe of FIG. 11A.

FIG. 10 is a series of longitudinal cross-sectional views of an example polymer layer 75 being fabricated by a robotic subsurface impact protection system to protect an underground pipe 50, along with corresponding lateral cross-sectional views of an example cross-section of injected polymer during the fabrication of the polymer layer 75, according to an embodiment. FIG. 11A is a longitudinal cross-sectional example composite view of the injected polymer layer 75 of FIG. 10 protecting the underground pipe 75, as fabricated by a robotic subsurface impact protection system, according to an embodiment. FIG. 11B is an enlarged view of the injected polymer layer and pipe of FIG. 11A. FIG. 10 illustrates an example methodology of the CPS being configured by code to generate the vertical variation profile for the polymer layer 75 over time. FIGS. 11A-11B illustrate the resulting profile pieced together by the CPS from the individual data points obtained in FIG. 10. In particular, FIG. 11B illustrates a zoomed view of the generated vertical profile for the polymer layer 75 in the illustration of FIG. 11A.

In some embodiments, the CPS is configured by code to track the path of the injected polymer layer 75 (point-by-point) by taking the real time data of the adjustable arm length—location of the injected polymer in the z-direction (e.g., as measured by a depth gauge)—and the thickness of the polymer layer 75, as illustrated in FIGS. 9A-9B. In some such embodiments, thickness measurements of the polymer layer 75 are estimated as described above from photos taken by the infrared camera. Moreover, the adjustable arm length can be obtained directly from the control system of the vehicle, such as through use of a depth gauge or other technique of maintaining or measuring the deployed length of the ripper arm below ground (e.g., the fabrication depth). In some embodiments, the CPS is configured by code to obtain this data at different time steps, as illustrated in FIG. 10 (showing five distinct time steps), in order to connect different thicknesses at different injection points. This allows an approximate shape for the deposited layer 75 to be obtained, as illustrated in FIGS. 11A-11B. Discretizing the continuous data into smaller time steps results in greater predictive accuracy of the shape of the deposited layer.

Figure 12:
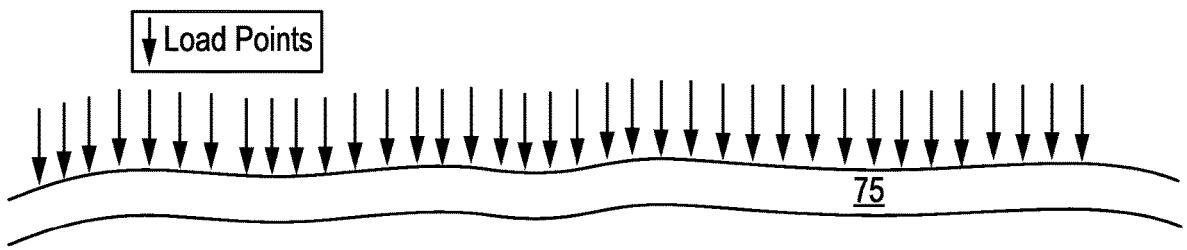
FIG. 12 is a longitudinal cross-section view of an example injected polymer layer fabricated by a robotic subsurface impact protection system, together with various load points and corresponding estimated pressure forces, according to an embodiment.

FIG. 12 is a longitudinal cross-section view of an example injected polymer layer 75 fabricated by a robotic subsurface impact protection system, together with various load points and corresponding estimated pressure forces, according to an embodiment. FIG. 12 illustrates how different points on the polymer layer 75 can be subjected to different vertical forces from the different combinations of subsurface layers (e.g., subsurface layer variation) above them.

With regard to the strength of the polymer layer 75, in some embodiments, a GPR is utilized to distinguish the subsurface layers above the protective polymer sheet 75 and assign an average weight or density for the above layers correspondingly, as illustrated in FIG. 12. These assigned weights or densities are recognized as local load points acting above the existing polymer protection layer, as illustrated in FIG. 12. These loads are fed into a finite element analysis model of the CPS to estimate the stress and bending moments over the polymer, providing reassurance of the structure strength over its lifetime.

With regard to the thermal deformation of subsurface objects, in some embodiments, infrared cameras are installed above the adjustable ripper arms with an appropriate angle allowing them to take records of the thermal distribution of the top surface of the deposited polymer layer. These images are then fed continuously into a finite element analysis model of the CPS to evaluate expanding and shrinkage potentials of the newly fabricated polymer layer. This is considered as further assurance that the polymer layer will not undergo a major deformation which potentially could hinder the protection system. In addition, the CPS is configured to incorporate feedback of potential deformation portions and adjust fabrication of the polymer layer accordingly.

Example embodiments provide for pipeline protection and encroachment risk mitigation through automation. Example embodiments further protect buried pipelines/assets from above-ground impact damage through automation. Some such embodiments utilize various robotic, sensing, and computing technologies embedded into a single robotic vehicle to provide a fully autonomous (and even self-contained) or semi-autonomous solution to facilitate the protection of buried assets (e.g., pipelines) from above-ground impact damage. Some such embodiments incorporate sensing devices on an automated robotic vehicle that can deliver a continuous or semi-continuous molten polymer stream below the surface from above without the need for trenching and back-filing. Some such embodiments provide for inspection and monitoring of the deployed protective solution as well as different parameters to control the robotic vehicle, such as velocity, angle/rate of deposition, depth, location, tracking, and the like.

The described techniques herein can be implemented using a combination of sensors, cameras, GPRs, and other devices including computing or other logic circuits configured (e.g., programmed) to carry out their assigned tasks. These devices are located on or in (or otherwise in close proximity to) the robotic vehicle or processing circuitry for carrying out the techniques. In some example embodiments, the control logic is implemented as computer code configured to be executed on a computing circuit (such as a microprocessor) to perform the control steps that are part of the technique. For ease of description, this processing logic (e.g., ASIC, FPGA, processor, custom circuit, or the like) is referred to as a computerized control system (CCS) or computer processing system (CPS) throughout. For further ease of description, this CCS or CPS is programmable by code to perform the processing logic (or otherwise customize the CCS or CPS to perform its intended purpose).

Figure 13:
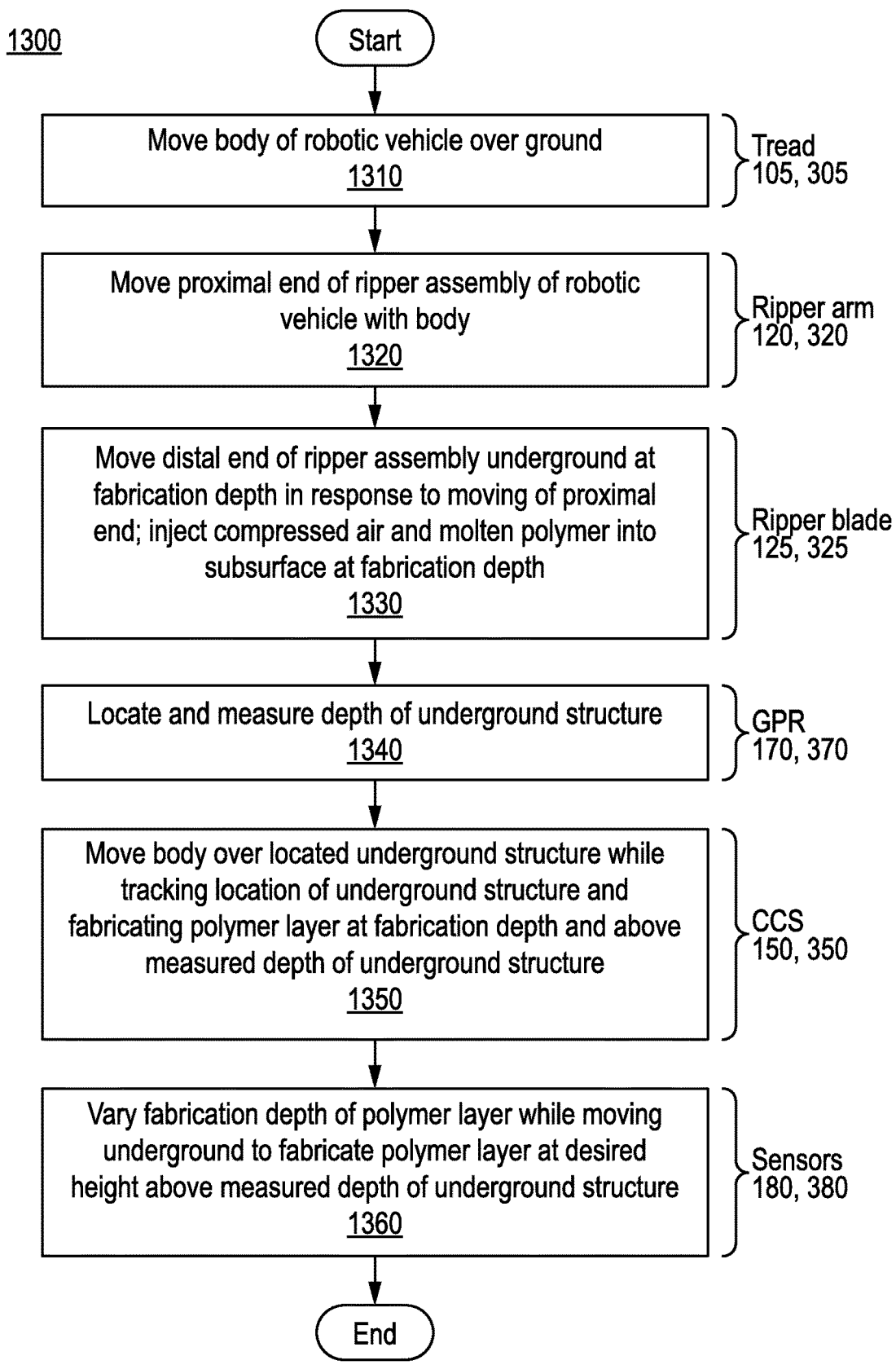
FIG. 13 is a flow diagram of an example method of fabricating a subsurface polymer layer to protect an underground pipe using a robotic subsurface impact protection system, according to an embodiment.

FIG. 13 is a flow diagram of an example method 1300 of fabricating a subsurface polymer layer (such as polymer layer 75) to protect an underground pipe (such as pipe 50) using a robotic subsurface impact protection system (such as robotic subsurface impact protection systems 100 and 300), according to an embodiment.

Some or all of the method 1300 can be performed using components and techniques illustrated in FIGS. 1 through 12. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause all or portions of the method 1300 (or other disclosed method) to be carried out. It should be noted that in other embodiments, the order of the operations can be varied, and that some of the operations can be omitted. Some or all of the method 1300 can also be performed using logic, circuits, or processors located on or in electrical communication with a processing circuit configured to carry out the method 1300.

The method 1300 is an automated method of protecting an underground structure (such as hydrocarbon pipe 50) by fabricating a subsurface polymer layer (such as polymer layer 50) using a moving robotic vehicle (such as robotic vehicle 110 or 310) under control of a computerized control system (CCS, such as CCS 150 or 350) of the robotic vehicle that is configured by code to carry out or control the carrying out (or set in motion the carrying out) of the steps of method 1300. In the method 1300, processing begins with the step of moving 1310 a body (such as body 115 or 315) of the robotic vehicle over the ground (such as ground 25) by controlling, using the CCS, a rotational member (such as tread 105 or 305) of the robotic vehicle that is coupled to the body and contacts the ground. The method 1300 further includes the step of moving 1320 a proximal end (such as close to the body) of a ripper assembly (such as ripper arm 120 or 320) of the robotic vehicle with the body, the proximal end being coupled to the body.

In addition, the method 1300 includes the step of moving 1330 a distal end (such as underground and far from the body) of the ripper assembly (such as ripper blade 125 or 325) underground at a fabrication depth (such as a polymer ejection depth on the ripper blade 125 or 325) in response to the moving of the proximal end, the distal end being coupled to the proximal end (such as by the ripper arm 120 or 320). The method 1300 also includes the step of locating 1340 and measuring a depth of the underground structure using a ground penetrating radar (GPR, such as GPR 170 or 370) of the robotic vehicle. Further, the method 1300 includes the compound step of moving 1350 the body over the located underground structure by controlling (such as steering), using the CCS, the rotational member while tracking, using the CCS, the location of the underground structure and fabricating (such as injecting compressed air and molten polymer into the subsurface), using the distal end of the ripper assembly under the control of the CCS, the polymer layer at the fabrication depth and above the measured depth of the underground structure.

In addition, in the method 1300, the sub step (from step 1350) of fabricating the polymer layer includes the step of varying 1360 the fabrication depth of the polymer layer by adjusting a longitudinal tilt angle (such as adjusting the longitudinal tilt of ripper blade 125 or 325) of the ripper blade while moving underground. Here, the longitudinal tilt of the ripper blade is controllable (such as by the CCS) to adjust as directed. As such, this sub step further includes the step of fabricating the polymer layer at a desired height (such as 0.5 meters) above the measured depth of the underground structure by controlling, using the CCS, the longitudinal tilt angle of the ripper blade. To this end, the sub step includes the step of measuring a height of the fabrication depth above the underground structure using an ultrasonic sensor (such as sensor 180 or 380) of the distal end of the ripper assembly, and controlling, using the CCS, the fabricating of the polymer layer at the desired height above the underground structure by using the measured height.

In an example embodiment, in the method 1300, the sub step (from step 1350) of fabricating the polymer layer includes the steps of injecting, by a ripper blade of the ripper assembly at the distal end, compressed air and molten polymer into the subsurface at the fabrication depth, and supplying, by a ripper arm of the ripper assembly coupled to the body at the proximal end and to the ripper blade at the distal end, the compressed air and the molten polymer to the ripper blade. In an example embodiment, in the method 1300, the sub step (from step 1350) of fabricating the polymer layer includes the steps of varying an orientation (such as lateral tilt) of the polymer layer by adjusting a lateral tilt angle of the ripper blade while moving underground, imaging, using an infrared camera (such as camera 160 or 360) of the distal end of the ripper assembly, the orientation of the polymer layer, and fabricating the polymer layer to have a desired orientation (such as level with respect to gravity) by controlling, using the CCS, the lateral tilt angle of the ripper blade while using the infrared imaging of the orientation.

In an example embodiment, the method 1300 further includes the steps of storing thermoplastic polymer (such as HDPE beads) in a polymer storage container (such as polymer bead silo 130) coupled to the body, melting the stored thermoplastic polymer into the molten polymer and supplying the molten polymer to the ripper arm using a polymer melting unit (such as polymer melting unit 140) coupled to the body, storing the compressed air and supplying the stored compressed air to the ripper arm using a compressed air storage container (such as compressed air tank 135) coupled to the body, and supplying electric power to the robotic vehicle using a battery (such as battery pack 145) coupled to the body. Here, the robotic vehicle is self-contained and fabricates the polymer layer using the battery as its principal source of power.

In an example embodiment, in the method 1300, the sub step (from step 1350) of fabricating the polymer layer includes the steps of varying the fabrication depth of the polymer layer by adjusting a depth below the ground of the distal end of the ripper assembly while moving underground, and fabricating the polymer layer at a desired height above the underground structure by adjusting, using the CCS, the depth of the distal end of the ripper assembly. To this end, the sub step further includes the steps of measuring a height of the fabrication depth above the underground structure using an ultrasonic sensor (such as sensor 180 or 380) of the distal end of the ripper assembly, and controlling, using the CCS, the fabricating of the polymer layer at the desired height above the underground structure by using the measured height.

In an example embodiment, in the method 1300, the sub step (from step 1350) of fabricating the polymer layer includes the steps of measuring the fabrication depth using a depth gauge (such as depth gauge 155 or 355) of the robotic vehicle, measuring a thickness of the polymer layer using an infrared camera (such as camera 160 or 360) of the distal end of the ripper assembly, fabricating, under control of the CCS, the polymer layer to have a desired thickness by using the measured thickness of the polymer layer, and generating, using the CCS, a thickness variation profile of the polymer layer by tracking the measured fabrication depth and the measured thickness of the polymer layer over time. To this end, the sub step further includes the steps of generating, using the GPR, an elevation profile of distinct layers below the ground, the elevation profile including respective depth, thickness, and density measurements of the distinct layers, the distinct layers including the underground structure, the polymer layer, and a subsurface layer above the polymer layer, estimating, using the CCS, a subsurface load on the polymer layer by using the measured thickness and the measured density of the subsurface layer above the polymer layer, and setting, by the CCS, the desired thickness of the polymer layer based on the estimated subsurface load on the polymer layer.

In an example embodiment, in the method 1300, the sub step (from step 1350) of fabricating the polymer layer includes the steps of imaging a thermal distribution of a top surface of the polymer layer using an infrared camera (such as camera 160 or 360), and verifying, by the CCS, thermal integrity of the polymer layer or adjusting, by the CCS, the fabricating of the polymer layer to improve the thermal integrity of the polymer layer using the imaged thermal distribution of the top surface of the polymer layer.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A robotic vehicle for moving above ground while fabricating a subsurface polymer layer to protect an underground structure, the robotic vehicle comprising:

a body for moving over the ground;

a rotational member coupled to the body and configured to contact the ground and move the body over the ground during the fabricating of the subsurface polymer layer;

a ripper assembly having a proximal end coupled to and configured to move with the body, and a distal end coupled to the proximal end and configured to move underground at a fabrication depth in response to the movement of the proximal end while fabricating the polymer layer;

a ground penetrating radar (GPR) configured to locate and measure a depth of the underground structure below the ground during the fabricating of the polymer layer; and a computerized control system (CCS) configured to protect the underground structure by controlling the rotational member, the distal end of the ripper assembly, and the GPR to move the body over the located underground structure while tracking the location of the underground structure and fabricating the polymer layer at the fabrication depth and above the measured depth of the underground structure, wherein the ripper assembly comprises:

a ripper blade at the distal end and configured to fabricate the polymer layer by injecting compressed air and molten polymer into the subsurface at the fabrication depth; and a ripper arm coupled to the body at the proximal end and to the ripper blade at the distal end, and configured to supply the compressed air and the molten polymer to the ripper blade during the fabricating of the polymer layer, wherein:

the ripper blade is adjustable in lateral tilt angle while moving underground to vary an orientation of the polymer layer during the fabricating of the polymer layer;

the distal end of the ripper assembly comprises an infrared camera configured to image the orientation of the polymer layer during the fabricating of the polymer layer; and the CCS is configured to control the fabricating of the polymer layer to have a desired orientation by controlling the lateral tilt angle of the ripper blade while using the infrared imaging of the orientation during the fabricating of the polymer layer.

2. The robotic vehicle of claim 1, wherein:

the ripper blade is adjustable in longitudinal tilt angle while moving underground to vary the fabrication depth during the fabricating of the polymer layer; and the CCS is configured to control the fabricating of the polymer layer at a desired height above the measured depth of the underground structure by controlling the longitudinal tilt angle of the ripper blade during the fabricating of the polymer layer.

3. The robotic vehicle of claim 1, wherein:

the distal end of the ripper assembly is adjustable in depth below the ground while moving underground to vary the fabrication depth during the fabricating of the polymer layer; and the CCS is configured to control the fabricating of the polymer layer at a desired height above the underground structure by adjusting the depth of the distal end of the ripper assembly during the fabricating of the polymer layer.

4. The robotic vehicle of claim 3, wherein:

the distal end of the ripper assembly comprises an ultrasonic sensor configured to measure a height of the fabrication depth above the underground structure during the fabricating of the polymer layer; and the CCS controls the fabricating of the polymer layer at the desired height above the underground structure by using the measured height during the fabricating of the polymer layer.

5. A robotic vehicle for moving above ground while fabricating a subsurface polymer layer to protect an underground structure, the robotic vehicle comprising:

a body for moving over the ground;

a rotational member coupled to the body and configured to contact the ground and move the body over the ground during the fabricating of the subsurface polymer layer;

a ripper assembly having a proximal end coupled to and configured to move with the body, and a distal end coupled to the proximal end and configured to move underground at a fabrication depth in response to the movement of the proximal end while fabricating the polymer layer;

a ground penetrating radar (GPR) configured to locate and measure a depth of the underground structure below the ground during the fabricating of the polymer layer; and a computerized control system (CCS) configured to protect the underground structure by controlling the rotational member, the distal end of the ripper assembly, and the GPR to move the body over the located underground structure while tracking the location of the underground structure and fabricating the polymer layer at the fabrication depth and above the measured depth of the underground structure, wherein the ripper assembly comprises:

a ripper blade at the distal end and configured to fabricate the polymer layer by injecting compressed air and molten polymer into the subsurface at the fabrication depth; and a ripper arm coupled to the body at the proximal end and to the ripper blade at the distal end, and configured to supply the compressed air and the molten polymer to the ripper blade during the fabricating of the polymer layer, the robotic vehicle further comprising:

a polymer storage container coupled to the body and configured to store thermoplastic polymer;

a polymer melting unit coupled to the body and configured to melt the stored thermoplastic polymer into the molten polymer and supply the molten polymer to the ripper arm;

a compressed air storage container coupled to the body and configured to store the compressed air and supply the stored compressed air to the ripper arm; and a battery coupled to the body and configured to supply electric power to the robotic vehicle, wherein the robotic vehicle is self-contained and configured to fabricate the polymer layer using the battery as its principal source of power.

6. The robotic vehicle of claim 5, wherein:

the ripper blade is adjustable in longitudinal tilt angle while moving underground to vary the fabrication depth during the fabricating of the polymer layer; and the CCS is configured to control the fabricating of the polymer layer at a desired height above the measured depth of the underground structure by controlling the longitudinal tilt angle of the ripper blade during the fabricating of the polymer layer.

7. The robotic vehicle of claim 5, wherein:

the distal end of the ripper assembly is adjustable in depth below the ground while moving underground to vary the fabrication depth during the fabricating of the polymer layer; and the CCS is configured to control the fabricating of the polymer layer at a desired height above the underground structure by adjusting the depth of the distal end of the ripper assembly during the fabricating of the polymer layer.

8. The robotic vehicle of claim 7, wherein:

the distal end of the ripper assembly comprises an ultrasonic sensor configured to measure a height of the fabrication depth above the underground structure during the fabricating of the polymer layer; and the CCS controls the fabricating of the polymer layer at the desired height above the underground structure by using the measured height during the fabricating of the polymer layer.

9. A robotic vehicle for moving above ground while fabricating a subsurface polymer layer to protect an underground structure, the robotic vehicle comprising:

a body for moving over the ground;

a rotational member coupled to the body and configured to contact the ground and move the body over the ground during the fabricating of the subsurface polymer layer;

a ripper assembly having a proximal end coupled to and configured to move with the body, and a distal end coupled to the proximal end and configured to move underground at a fabrication depth in response to the movement of the proximal end while fabricating the polymer layer;

a ground penetrating radar (GPR) configured to locate and measure a depth of the underground structure below the ground during the fabricating of the polymer layer; and a computerized control system (CCS) configured to protect the underground structure by controlling the rotational member, the distal end of the ripper assembly, and the GPR to move the body over the located underground structure while tracking the location of the underground structure and fabricating the polymer layer at the fabrication depth and above the measured depth of the underground structure, wherein:

the distal end of the ripper assembly is adjustable in depth below the ground while moving underground to vary the fabrication depth during the fabricating of the polymer layer; and the CCS is configured to control the fabricating of the polymer layer at a desired height above the underground structure by adjusting the depth of the distal end of the ripper assembly during the fabricating of the polymer layer, the robotic vehicle further comprising a depth gauge configured to measure the fabrication depth during the fabrication of the polymer layer, wherein:

the distal end of the ripper assembly comprises an infrared camera configured to measure a thickness of the polymer layer during the fabricating of the polymer layer;

the CCS is configured to control the fabricating of the polymer layer to have a desired thickness by using the measured thickness of the polymer layer during the fabricating of the polymer layer; and the CCS is configured to generate a thickness variation profile of the polymer layer by tracking the measured fabrication depth and the measured thickness of the polymer layer over time during the fabricating of the polymer layer.

10. The robotic vehicle of claim 9, wherein:

the GPR is configured to generate an elevation profile of distinct layers below the ground during the fabricating of the polymer layer, the elevation profile including respective depth, thickness, and density measurements of the distinct layers, the distinct layers including the underground structure, the polymer layer, and a subsurface layer above the polymer layer;

the CCS is configured to estimate a subsurface load on the polymer layer during the fabricating of the polymer layer by using the measured thickness and the measured density of the subsurface layer above the polymer layer; and the CCS is configured to set the desired thickness of the polymer layer during the fabricating of the polymer layer based on the estimated subsurface load on the polymer layer.

11. The robotic vehicle of claim 9, wherein the ripper assembly comprises:

a ripper blade at the distal end and configured to fabricate the polymer layer by injecting compressed air and molten polymer into the subsurface at the fabrication depth; and a ripper arm coupled to the body at the proximal end and to the ripper blade at the distal end, and configured to supply the compressed air and the molten polymer to the ripper blade during the fabricating of the polymer layer.

12. The robotic vehicle of claim 9, wherein:

the distal end of the ripper assembly comprises an ultrasonic sensor configured to measure a height of the fabrication depth above the underground structure during the fabricating of the polymer layer; and the CCS controls the fabricating of the polymer layer at the desired height above the underground structure by using the measured height during the fabricating of the polymer layer.

13. An automated method of protecting an underground structure by fabricating a subsurface polymer layer using a moving robotic vehicle under control of a computerized control system (CCS) of the robotic vehicle, the method comprising:

moving a body of the robotic vehicle over the ground by controlling, using the CCS, a rotational member of the robotic vehicle that is coupled to the body and contacts the ground;

moving a proximal end of a ripper assembly of the robotic vehicle with the body, the proximal end being coupled to the body;

moving a distal end of the ripper assembly underground at a fabrication depth in response to the moving of the proximal end, the distal end being coupled to the proximal end;

locating and measuring a depth of the underground structure using a ground penetrating radar (GPR) of the robotic vehicle; and moving the body over the located underground structure by controlling, using the CCS, the rotational member while tracking, using the CCS, the location of the underground structure and fabricating, using the distal end of the ripper assembly under the control of the CCS, the polymer layer at the fabrication depth and above the measured depth of the underground structure, wherein fabricating the polymer layer comprises:

imaging a thermal distribution of a top surface of the polymer layer using an infrared camera; and verifying, by the CCS, thermal integrity of the polymer layer or adjusting, by the CCS, the fabricating of the polymer layer to improve the thermal integrity of the polymer layer using the imaged thermal distribution of the top surface of the polymer layer.

14. The method of claim 13, wherein fabricating the polymer layer comprises:

injecting, by a ripper blade of the ripper assembly at the distal end, compressed air and molten polymer into the subsurface at the fabrication depth; and supplying, by a ripper arm of the ripper assembly coupled to the body at the proximal end and to the ripper blade at the distal end, the compressed air and the molten polymer to the ripper blade.

15. The method of claim 14, wherein fabricating the polymer layer comprises:
varying the fabrication depth of the polymer layer by adjusting a longitudinal tilt angle of the ripper blade while moving underground; and
fabricating the polymer layer at a desired height above the measured depth of the underground structure by controlling, using the CCS, the longitudinal tilt angle of the ripper blade.

16. The method of claim 14, wherein fabricating the polymer layer comprises:
varying an orientation of the polymer layer by adjusting a lateral tilt angle of the ripper blade while moving underground;
imaging, using an infrared camera of the distal end of the ripper assembly, the orientation of the polymer layer; and
fabricating the polymer layer to have a desired orientation by controlling, using the CCS, the lateral tilt angle of the ripper blade while using the infrared imaging of the orientation.

17. The method of claim 14, further comprising:
storing thermoplastic polymer in a polymer storage container coupled to the body;
melting the stored thermoplastic polymer into the molten polymer and supplying the molten polymer to the ripper arm using a polymer melting unit coupled to the body;
storing the compressed air and supplying the stored compressed air to the ripper arm using a compressed air storage container coupled to the body; and
supplying electric power to the robotic vehicle using a battery coupled to the body,
wherein the robotic vehicle is self-contained and fabricates the polymer layer using the battery as its principal source of power.

18. The method of claim 13, wherein fabricating the polymer layer comprises:
varying the fabrication depth of the polymer layer by adjusting a depth below the ground of the distal end of the ripper assembly while moving underground; and
fabricating the polymer layer at a desired height above the underground structure by adjusting, using the CCS, the depth of the distal end of the ripper assembly.

19. The method of claim 18, wherein fabricating the polymer layer comprises:
measuring a height of the fabrication depth above the underground structure using an ultrasonic sensor of the distal end of the ripper assembly; and
controlling, using the CCS, the fabricating of the polymer layer at the desired height above the underground structure by using the measured height.

20. The method of claim 18, wherein fabricating the polymer layer comprises:
measuring the fabrication depth using a depth gauge of the robotic vehicle;
measuring a thickness of the polymer layer using an infrared camera of the distal end of the ripper assembly;
fabricating, under control of the CCS, the polymer layer to have a desired thickness by using the measured thickness of the polymer layer; and
generating, using the CCS, a thickness variation profile of the polymer layer by tracking the measured fabrication depth and the measured thickness of the polymer layer over time.

* * * * *